United States Patent
Yoshida et al.

[11] Patent Number: 5,583,941
[45] Date of Patent: Dec. 10, 1996

[54] IMAGING PROCESSOR

[75] Inventors: Eiichi Yoshida, Toyokawa; Yoshikazu Ikenoue, Toyohashi; Keiji Nakatani, Toyokawa, all of Japan

[73] Assignee: Minolta Co., Ltd., Osaka, Japan

[21] Appl. No.: 326,002

[22] Filed: Oct. 19, 1994

[30] Foreign Application Priority Data

Oct. 20, 1993 [JP] Japan ................................. 5-262284

[51] Int. Cl.⁶ ................................................. H04L 9/08
[52] U.S. Cl. ........................... 380/51; 380/18; 380/55; 380/21
[58] Field of Search ............................ 380/18, 51, 55, 380/21

[56] References Cited

U.S. PATENT DOCUMENTS

| | | | |
|---|---|---|---|
| 4,835,713 | 3/1989 | Pastor | 380/51 |
| 4,949,381 | 8/1990 | Pastor | 380/51 |
| 5,189,292 | 2/1993 | Batterman et al. | 380/51 |
| 5,253,293 | 10/1993 | Shigemitsu et al. | 380/18 |
| 5,255,106 | 10/1993 | Castro | 380/18 |
| 5,337,361 | 8/1994 | Wang et al. | 380/51 |
| 5,351,136 | 9/1994 | Wu et al. | 380/18 |
| 5,398,283 | 5/1995 | Virga | 380/18 |
| 5,420,922 | 5/1995 | Lunblad et al. | 380/18 |
| 5,490,217 | 2/1996 | Wang et al. | 380/51 |
| 5,491,563 | 2/1996 | Pomeranz | 380/18 |

FOREIGN PATENT DOCUMENTS

| | | |
|---|---|---|
| 0396774 | 11/1990 | European Pat. Off. . |
| 2-214264 | 8/1990 | Japan . |
| 3-85872 | 4/1991 | Japan . |

OTHER PUBLICATIONS

"DCT Image coding using Adaptive Quantization Application to Digital Color Copiers," Kazuyuki Murata, Gazou Denshi Gakkaishi, vol. 10, No. 5 (1991) pp. 467–475.

*Primary Examiner*—Salvatore Cangialosi
*Attorney, Agent, or Firm*—Brinks Hofer Gilson & Lione

[57] ABSTRACT

In an image processor, a scramble device performs scramble processing to deform a document image by using scramble conditions by rearranging pixel data in the document image read by a reader. The scramble conditions are embedded in a hard copy of the document image subjected to the scramble processing in such a way that the scramble conditions cannot be easily seen by the naked eye. Thus, the scramble conditions are included in the hard copy. The hard copy is reproduced by using the scramble conditions restored from the hard copy. If a user desires, the scramble processing is performed not on a front page, but on the following pages. The scramble processing can be performed at different levels, and the scramble conditions include a level of scramble processing. Preferably, special marks can be registered, and a level of scramble processing is also registered for each of the marks. If one of the special marks are extracted from a document image, the repetition time is determined automatically according to the registered data.

22 Claims, 26 Drawing Sheets

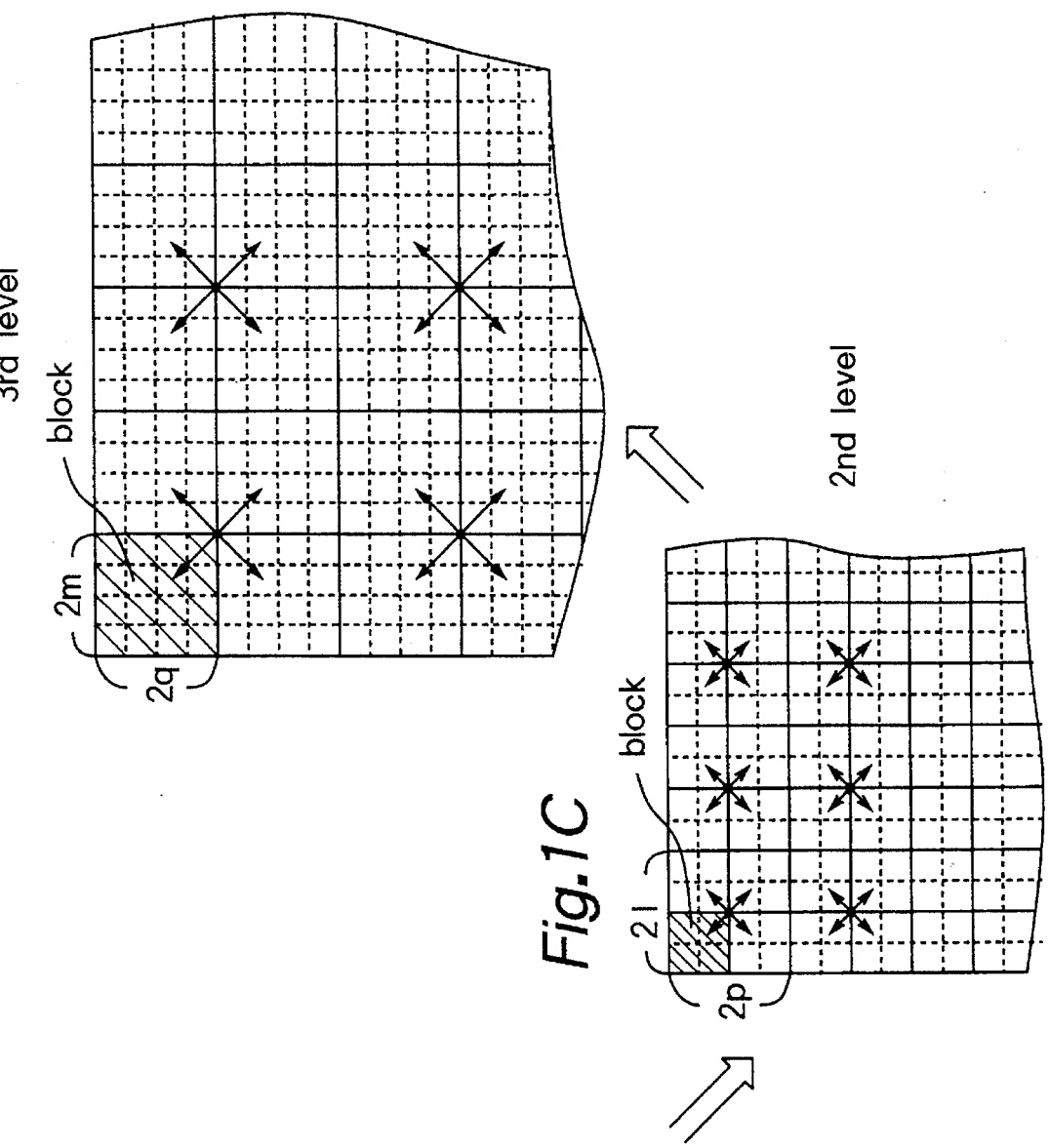
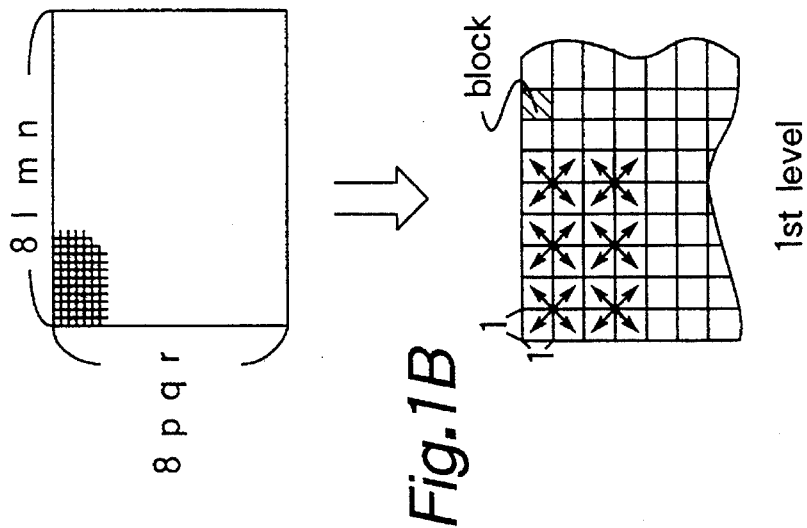

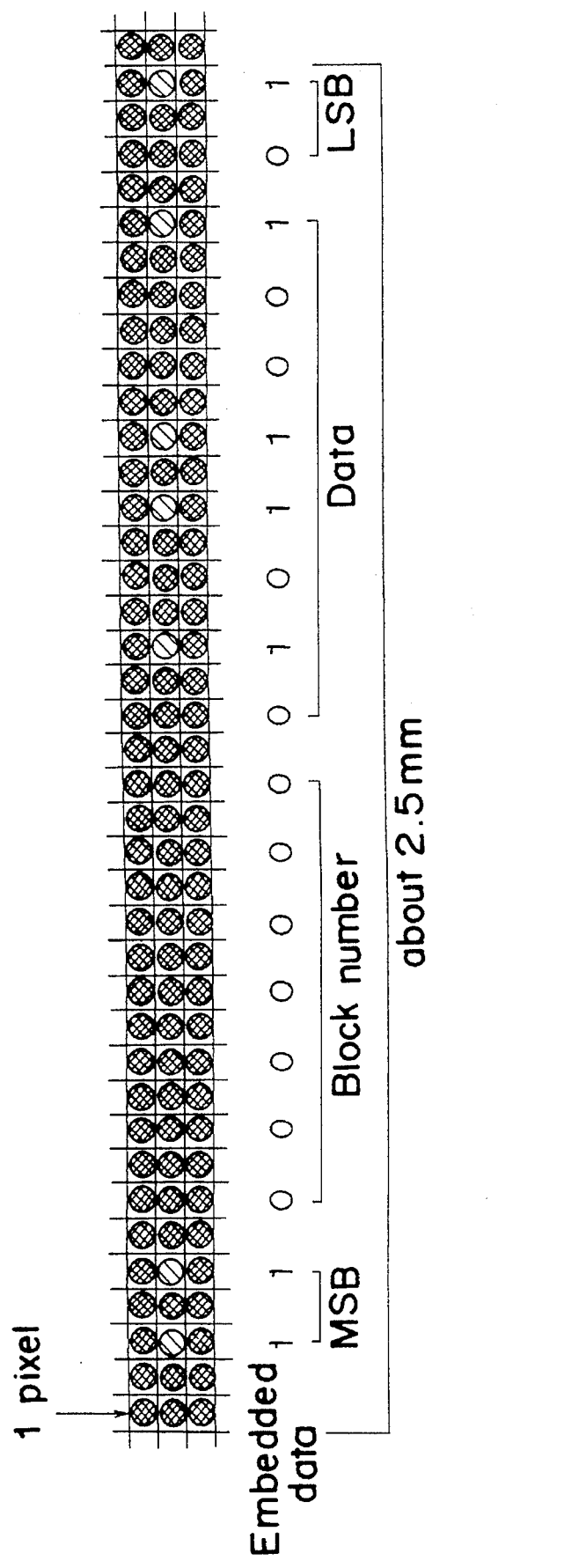

Fig.7A
Fig.7B
Digital data
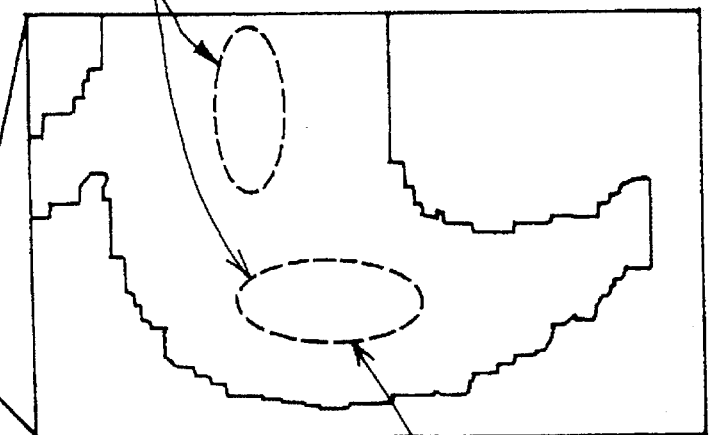
Fig.7D          Fig.7C

→ Path of embedding of 1st set

← Path of embedding of 2nd set

↑ Path of embedding of 3nd set

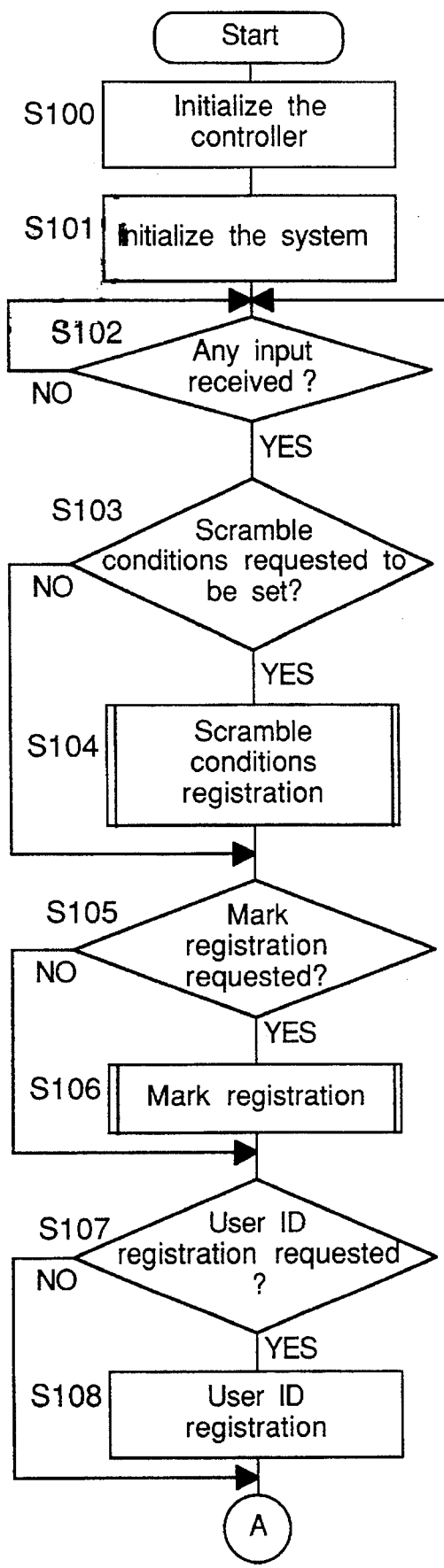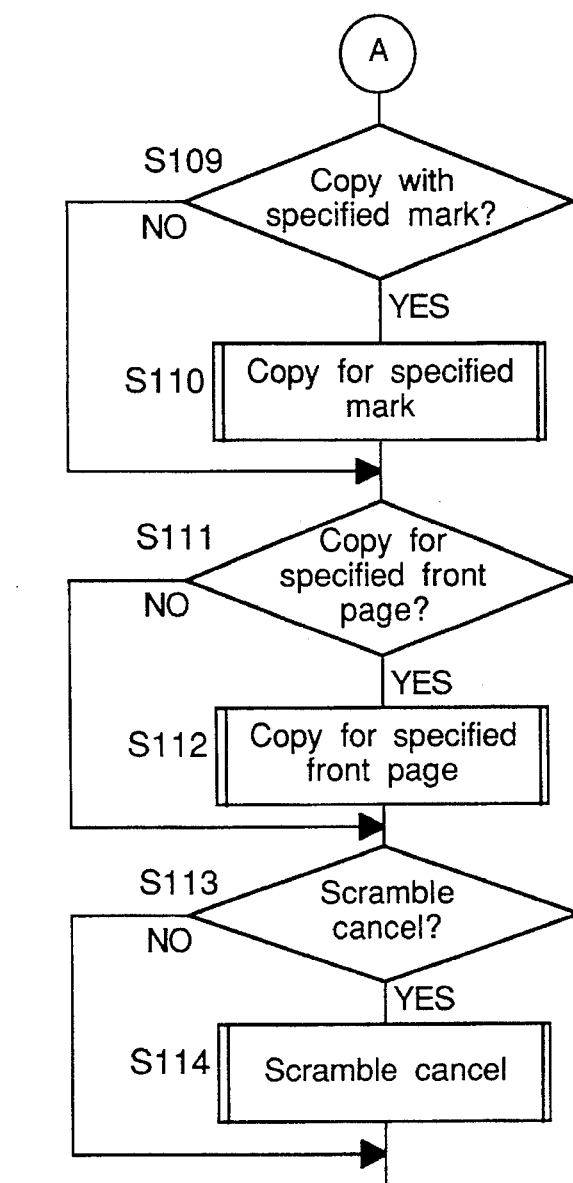
Fig. 15

IMAGING PROCESSOR

BACKGROUND OF THE INVENTION

1. Field of the Invention

The present invention relates to an image processor such as a printer or a copying machine for preventing leakage of secret document caused by illegal copying thereof.

2. Description of the Prior Art

Recently, copying machines are developed and used widely. Then, infringement of copy right and illegal copies of secret documents become problems to be solved. An apparatus disclosed in Japanese Patent laid open Publication 2-214262/1990 performs scramble processing and scramble cancel processing for image data of documents in order to prevent leakage of secret documents. In the scramble processing, an image data is converted to coded image data which cannot be read and the coded image data is printed, while in the scramble cancel processing, coded image data read from the printed image is converted to original image data and the original image data is printed.

However, each apparatus may use a program of different algorithm for scramble processing. In such a case, in order to decode coded image data, it is necessary to find an apparatus having the same scramble program used to obtain the coded image data, and this is inconvenient. On the other hand, if apparatuses installing the same programs for scramble and scramble cancel programs are available, this situation is convenient for a user, but leakage of illegal copies cannot be prevented effectively.

An apparatus disclosed in EPC 39 66 774 performs scramble processing of image data stored in an optical or magnetic recording medium by using a scramble program stored in the medium. If this technical idea is applied to a copying machine, the scramble program has to be stored in a memory inside the copying machine, similarly to the above-mentioned apparatus of Japanese Patent laid open Publication 2214264/1990, or in a memory card or the like which can be connected to the machine. If a scramble program is stored in a memory inside the copying machine, the above-mentioned problems occur, while if it is stored in a memory card or the like, memory cards or the like have to be managed separately, and this is also inconvenient for practical operation.

An apparatus disclosed in Japanese Patent laid open Publication 3-85872/1991 first requests a user to input his or her identification 'ID' number. Then, it converts the image data to coded data according to a program in correspondence to the ID number, and the coded data is printed. When document images are decoded, the printed image is allowed to be read and restored after the ID number is received. However, this apparatus needs management of ID numbers. In order to cope with a situation when a user forgets his or her ID number, a bar code in correspondence to the ID number is printed at the same time as the coded data. However, because a bar code can be read relatively easily, if an ID number is read from an illegal copy, a document image may be restored illegally by a different apparatus. Thus, the apparatus has a problem to prevent illegal copies while managing ID numbers.

SUMMARY OF THE INVENTION

An object of the present invention is to provide an image processor which can prevent an illegal copy of secret documents more effectively.

Another object of the present invention is to provide an image processor hard to cancel scramble processing.

A different object of the present invention is to provide an image processor which does not need to set a level of scramble processing for each secret document.

A still different object of the present invention is to provide an image processor which can manage secret documents which have been subjected to scramble processing.

In one aspect of the present invention, an image processor comprises a scramble means and a scramble cancel means. The scramble means performs scramble processing to deform a document image by using scramble conditions by rearranging pixel data in the document image read by said read means. The scramble conditions are embedded in a hard copy of the document image subjected to the scramble processing in such a way that the scramble conditions cannot be recognized with naked eyes easily. Thus, the scramble conditions are included in the hard copy. The scramble cancel means restores a document image by using the scramble conditions restored from the hard copy. If a user desires, the scramble processing is performed not on a front page, but on the following pages. Alternately, the level of the scramble processing on a front page is limited to a low level. Thus, management of documents becomes easy by using the front page which can be read easily.

In another aspect of the invention, the scramble processing can be repeated so that a degree of a scale of rearrangement increases as scramble processing is repeated, and the scramble conditions include a repetition times of scramble processing. Preferably, special marks, for example, marks such as "CONFIDENTIAL" can be registered, and a repetition time of scramble processing is also registered for each of the marks. If one of the special marks are extracted from a document image, the repetition time is determined automatically according to the registered data.

An advantage of the present invention is that management of scramble conditions is easy because they are embedded in a hard copy.

Another advantage of the present invention is that a level of scramble processing can be set automatically according marks detected from an image data on a document.

A different advantage of the invention is that documents can be managed easily by using front pages which are not subjected or subjected to scramble processing of a low order.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 1A–1D are diagrams for illustrating scramble processing;

FIG. 6 is a diagram of an example of density data of block number "1" embedded in an image;

FIGS. 7A–7D are diagrams on an image of a character "a" embedding a block data;

FIG. 15 is a main flowchart of a controller;

DETAILED DESCRIPTION OF THE PREFERRED EMBODIMENTS

Figure 2:
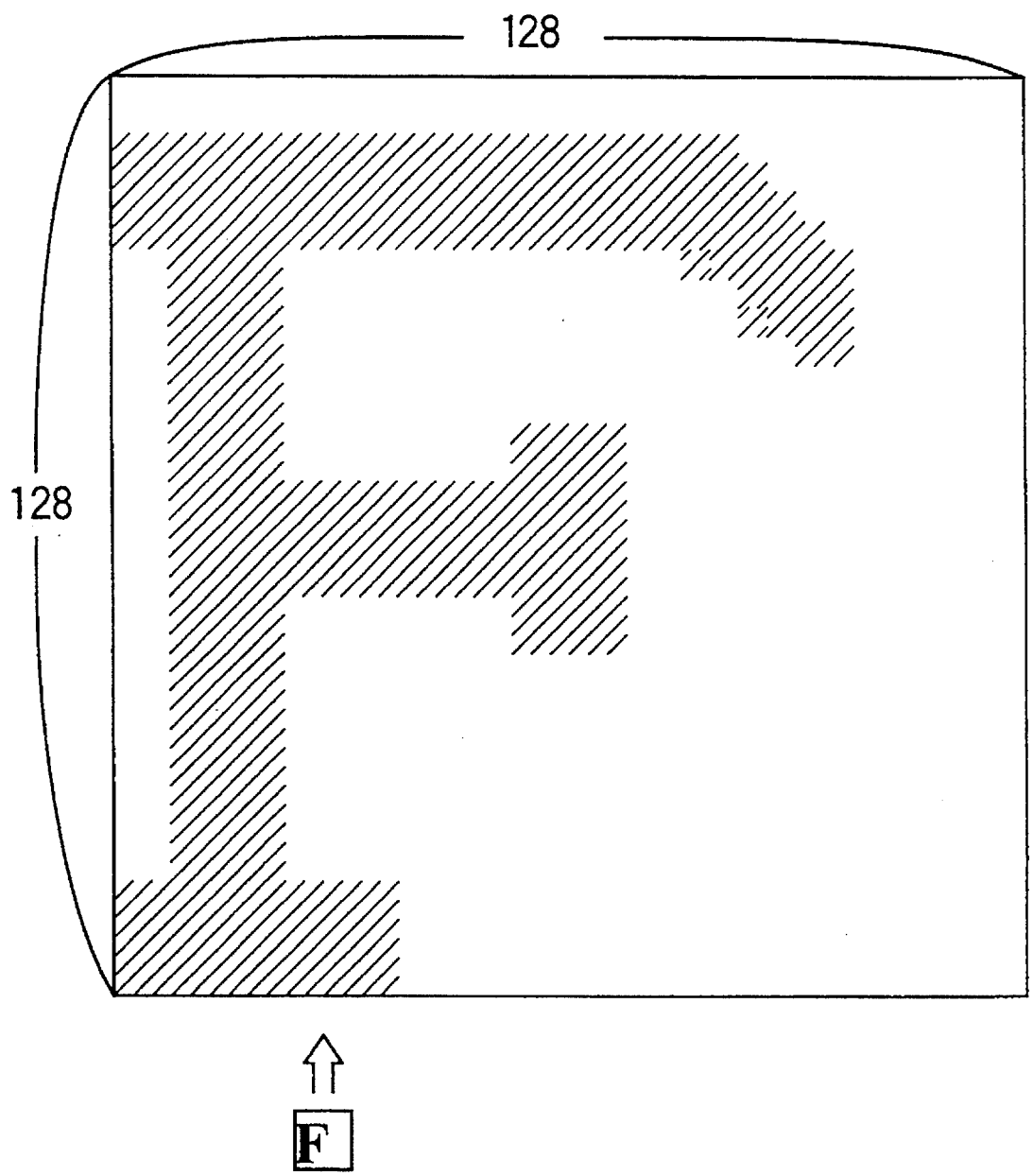
FIG. 2 is a diagram of an example of an image of a character "F" in an image area of 128*128 pixels.

Referring now to the drawings, wherein like reference characters designate like or corresponding parts throughout the views, embodiments of the present invention will be explained below in the following order:

(1) Scramble and scramble cancel processings (2) Embedding of scramble conditions and the like (3) Scramble conditions, scramble code and special copy modes (4) Outline of image processor (5) Details of various image processings
  5.1 Main routine
  5.2 Scramble conditions registration
  5.3 Mark registration
  5.4 Copy mode for specified mark
  5.5 Copy mode for front page
  5.6 Scramble cancel (1) Scramble and scramble cancel processings Scramble processing denotes a processing wherein an image data is converted with a prescribed code program to coded image data which cannot be read and the coded image data is printed. In the scramble processing, pixel data of a document image is deformed according to prescribed rules of operation to be converted to am image which cannot be read. This processing is applied for example to documents protected from leakage of secrets. Thus, a hard copy of a secret document obtained after subjected to scramble processing cannot be read, and the secrets are protected. In order to read the documents subjected-to the scramble processing, image data read from the hard copy is restored to the original documents. This reverse processing is called scramble cancel processing or deseramble processing.

In the scramble processing of an embodiment of the present invention, a matrix of pixel data of a document image is divided into minor matrices (or processing block) and adjacent four minor matrices are transposed according to prescribed rules. This operation is repeated by changing a size of the minor matrices, and each operation is denoted by a level of scramble processing or a scramble level. The scramble level may be changed according to the importance of a document to be copied. The size of minor matrices increased with increasing scramble level, so that the original image data are deformed more with increasing scramble level.

FIGS. 1A–1D show an example of scramble processing performed by an image processor of the embodiment. In this example, the scramble level is increased from one to three. Image data are divided into unit blocks or processing blocks and the positions of opposing processing blocks in a unit are transposed along diagonal directions. A size of processing block is set to have a larger value with increasing scramble level. Scramble processing of n-th level is performed on image data obtained by scramble processing of (n−1)-th level. Scramble cancel processing is performed by scramble processings of n-the level, (n−1)-th level, ..., second level and first level on the image data subjected to the scramble processing of n-th level.

As shown in FIG. 1A, an image data consists of for example 81 mn*8 pqr pixels, wherein l, m, n, p, q and r are natural numbers, $1<l<m<n$ and $1<p<q<r$. The values 81 mn and 8 pqr relate to sizes of processing blocks. That is, $81\ mn=2l*2m*2n$ and $8pqr=2p*2q*2r$, wherein 2l and 2p come from a size of processing block of first level, 2m and 2p come from that of second level and 2n and 2r come from that of third level. The above-mentioned inequalities on l, m, n, and p, q, r mean that a size of a processing block increase with increasing level of scramble processing.

It is assumed that a matrix A of pixel data of document image consists of elements $a_{g,h}$ (g=1, 2, ..., 8 pqr; h=1, 2, ..., 81 mn) while matrices B, C and D obtained by the scramble processing consists of elements $b_{g,h}$, $c_{g,h}$ and $d_{g,h}$, respectively.

$$A=(a_{g,h}), \quad (1)$$

$$B=(b_{g,h}), \quad (2)$$

$$C=(c_{g,h}), \quad (3)$$

and $$D=(d_{g,h}), \quad (4)$$

wherein g=1, 2, ..., 8 pqr and h=1, 2, ..., 81 mn.

In the scramble processing of first level shown in FIG. 1B, a processing block consists of one pixel, and a unit of four adjacent processing blocks consists of 2*2 pixels. The positions of opposing processing pixels along diagonal directions in a unit are transposed as shown by double arrows. That is, the matrix A has following relations (5) to the matrix B:

$$b_{2i-1,2j-1} = a_{2i,2j},$$
$$b_{2i-1,2j} = a_{2i,2j-1},$$
$$b_{2i,2j-1} = a_{2i-1,2j},$$
$$b_{2i,2j} = a_{2i-1,2j-1},$$
(5)

wherein $$i=1, 2, \ldots, 4pqr$$

and $$j=1, 2, \ldots, 4\ mn.$$

Scramble processing of second level is performed on the matrix B obtained by scramble processing of first level. First, as shown in FIG. 1C, the matrix B are divided into 4mn*4 qr of processing blocks B' consisting of 2l*2p pixels. The positions of opposing processing blocks B' in a unit of four adjacent processing blocks are transposed along diagonal directions. A matrix C obtained by the transposition consists of 4mn*4qr processing blocks C' each consisting of 2l*2p pixels, similarly to the matrix B, and the processing block C' has following relations (6) to the processing block B':

$$C_{2i-1,2j-1} = B'_{2i,2i},$$
$$C_{2i-1,2j} = B'_{2i,2j-1},$$
$$C_{2i,2j-1} = B'_{2i-1,2j},$$
$$C_{2i-2j} = B'_{2i-1,2j-1},$$
(6)

wherein $$i=1, 2, \ldots, 4\ qr,$$

and $$j=1, 2, \ldots, 4\ mn.$$

Scramble processing of third level is performed on the matrix C obtained by scramble processing of first level. First, as shown in FIG. 1D, the matrix C are divided into 4mn*4 qr of processing blocks C" each consisting of 2 ln*2 pr pixels. The positions of opposing processing blocks C" in a unit of four adjacent processing blocks are transposed along diagonal directions as shown by double arrows. A matrix D obtained by the transposition consists of 4ln*4 pr processing blocks D each consisting of 2m*2q pixels, similarly to the matrix C, and the processing block D" obtained by the transposition has following relations (7) to the processing block C":

$$D''_{2i-1,2j-1} = C''_{2i,2i},$$
$$D''_{2i-1,2j} = C''_{2i,2j-1},$$
$$D''_{2i,2j-1} = C''_{2i-1,2j},$$
$$D''_{2i,2j} = C''_{2i-1,2j-1},$$
(7)

wherein $$i=1, 2, \ldots, 4\ pr,$$

and $$j=1, 2, \ldots, 4\ ln.$$

Figure 3:
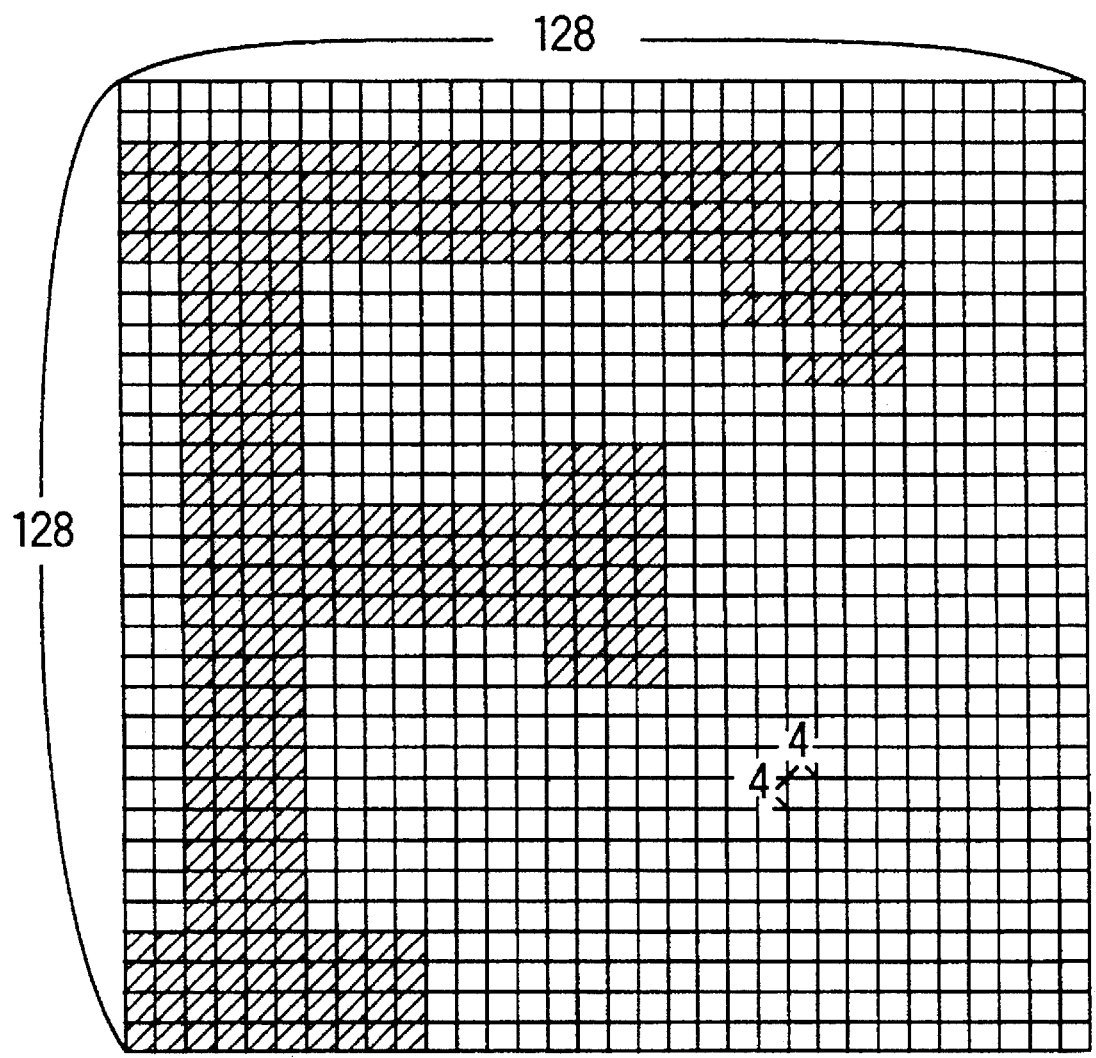
FIG. 3 is a diagram of the image area shown in FIG. 2 after scramble processing of second level.
Figure 4:
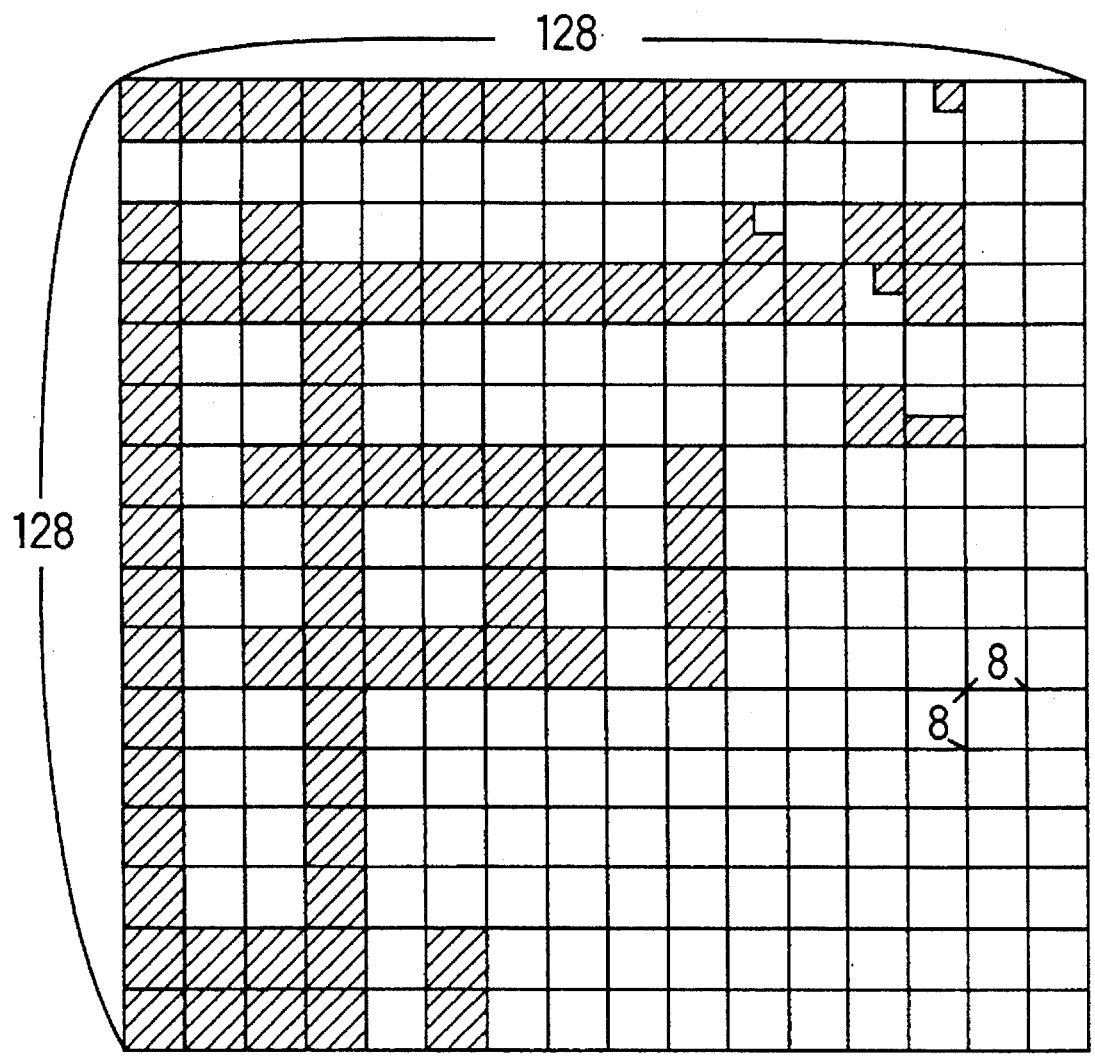
FIG. 4 is a diagram of the image area shown in FIG. 2 after scramble processing of third level.

FIGS. 2, 3 and 4 shows an example of a change of an image caused by scramble processing for an image area of 128*128 pixels. The image area corresponds to an area of 8 mm square for a sheet of paper of 4A size for resolution of 400 dots per inch (dpi). FIG. 2 shows an enlarged image of an image area of 128*128 pixels of an original image before scramble processing. The image area including a life-size character of "F" is shown at the bottom in FIG. 2.

In this example of image area, 4*4 pixels are treated in a unit or a character image is treated substantially as 32*32 pixels because such treatment does not deteriorate the character image practically. Therefore, scramble processing of first level does not change the image because it is performed by using processing blocks consisting of a pixel. Even if 4*4 pixels are not treated in a unit, an image does not deformed so largely.

FIG. 3 shows an image area obtained by scramble processing of second level performed by using processing blocks of 4*4 pixels (or l=p=2). It is apparent that the image area obtained by this scramble processing can be understood easily. Thus, after scramble processing of second level, characters in a document image would be read to some extent.

FIG. 4 shows an image area obtained by scramble processing of third level performed by using processing blocks of 4*4 pixels (or m=q=4). It is clear that the original image is deformed largely. Thus, after this scramble processing, most of characters in a document image would not be read.

As explained above, scramble cancel processing denotes a processing wherein image data read from a printed image which have been subjected to scramble processing is converted with a prescribed recovery program to original image data and the original image data is printed. In the scramble cancel processing, the operations which are used for the scramble processing is iterated in the reverse order. As to the scramble processing shown in FIGS. 2–4, the image data shown in FIG. 4 is first read and subjected to scramble processing of third level in the same conditions or with m=q=4. Thus, the image shown in FIG. 3 is reproduced. Next, the image is further subjected to scramble processing of second level in the same conditions or with l=p=2. Then, an image which has been obtained after scramble processing of first level is reproduced. Finally, the image is subjected to scramble processing of first level. Thus, the original image shown in FIG. 2 can be restored.

A user can set desired values of l, m, p and q. The values of n and r are determined from the four values and the entire size of an image. For example, if an image consists of 4,800*3,200 pixels for a paper size of A4 and a resolution of 400 dpi, n=75 and r=50.

(2) Embedding scramble conditions and the like

When a user sets scramble conditions with an operation unit, the image processor embeds scramble information in an image after is subjected to scramble processing. The scramble information includes scramble conditions, a level of scramble processing and a scramble code. The scramble code is a code number used to permit scramble cancel processing. The scramble information is converted to a digital data and the data is embedded in an image as a digital data consisting of discrete dots, as will be explained below. The scramble conditions includes values of l, m, p and q of 2 bytes or so and a level of scramble processing, where the values l, m, p and q represent sizes of processing blocks used in scramble processing of second and third levels. The scramble code for scramble cancel is expressed as a 4-byte data. The level of scramble is represented as a 1-byte data.

In the embedding of a digital data on scramble information, the digital data has to be embedded so that a person cannot recognize it with naked eyes easily. If the digital data cannot be embedded in such a way because of its long length, it is divided into blocks of a predetermined length, and the blocks are embedded. In this case, a block number is added for each block in order to identify a position of a block in the digital data. When blocks are read, the blocks are rearranged in the order of block number. Data of blocks which cannot be read are eliminated.

In the present embodiment, the digital data on scramble information is divided into blocks of 8 bits. FIG. 6 shows a situation of embedding a block data of the first and 65-th blocks of a data shown at the upper side in FIG. 6. A block number is represented with 7 bits, and a block data of 15 bits is defined between recognition codes MSB ("11") and LSB ("01"). When an image is read, if there are found a prescribed number of pixels between "11" and "01", they are decided to be an embedded block data.

FIG. 6 illustrates a situation when a block data is embedded in an image, one level (say "0") of a binarized data is expressed at a density which is the same as those of adjacent pixels, while the other level ("1") is expressed at a density which is different a little from those of adjacent pixels. This data is hereinafter referred to as "density data". Further, in the example shown in FIG. 6, each density data in a block is arranged with a distance of one pixel. A block data consists of total 19 bits (=2+7+8+2), and it can be embedded if there is a line of a length longer than 40 dots, as shown as a central horizontal dot line in FIG. 6. The 40 dots has a length of 1/10 inch (about 2.5 mm) for a printer or an image reader of a resolution of 400 dots per inch, and black lines of such a length may exist in most documents including characters. That is, an additional data of 40 dots can be embedded sufficiently in such a document.

Next, data conversion on scramble information as a digital data into density data and the embedding of the density data of blocks in an image in a hard copy is explained. FIGS. 7A–7D illustrate an example of the data conversion and the embedding. FIG. 7A shows an enlarged view of a character "a" of a font of 12 point, while FIG. 7B denotes an enlarged view of a part of the character "a". In this example, a digital data ("1101") is embedded at positions as shown in FIG. 7C encircled with ovals. The density data shown in FIG. 7C is obtained by converting the data ("1101") shown in FIG. 7D, and they are embedded at a constant pitch (pixel distance).

Block data of a digital data can be embedded in an image at a desired position irrespective of position and direction of density data, and each dot of a digital data is so small not to be recognized with naked eyes. Because the embedding position of a digital data is not definite, it becomes impossible for a user who wants to leak secret documents to copy them by shading the block data embedded in a hard copy obtained after scramble processing.

Figure 8:
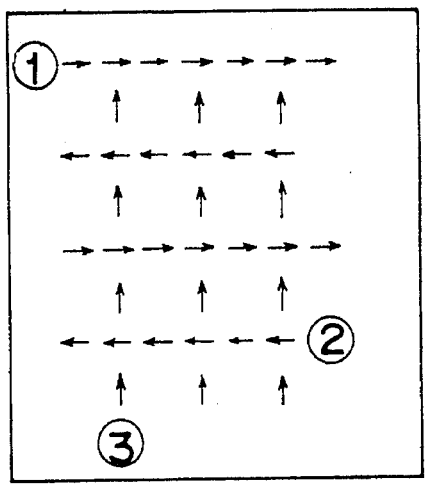
FIG. 8 is a diagram illustrating a procedure for embedding many block data in a hard copy.

However, if block data are all embedded in a certain area, they may become prominent as noises. Because scramble information is desirable not to be recognized by an ordinary user, it is embedded dispersed in a hard copy. As an example shown in FIG. 8, block data are embedded along three directions, successively from a corner. Further, in order to minimize the possibility of absence of density data for a dirty document or for a document prepared as a patchwork, it is desirable to embed a plurality of sets of the same block data repeatedly in a hard copy as shown in FIG. 8. There may be a case wherein a part of a digital data is recovered erroneously due to dirtiness or the like. In this case, an odd number of sets of additional data is embedded in a hard copy, and an effective data is determined from a decision by majority.

Figure 9:
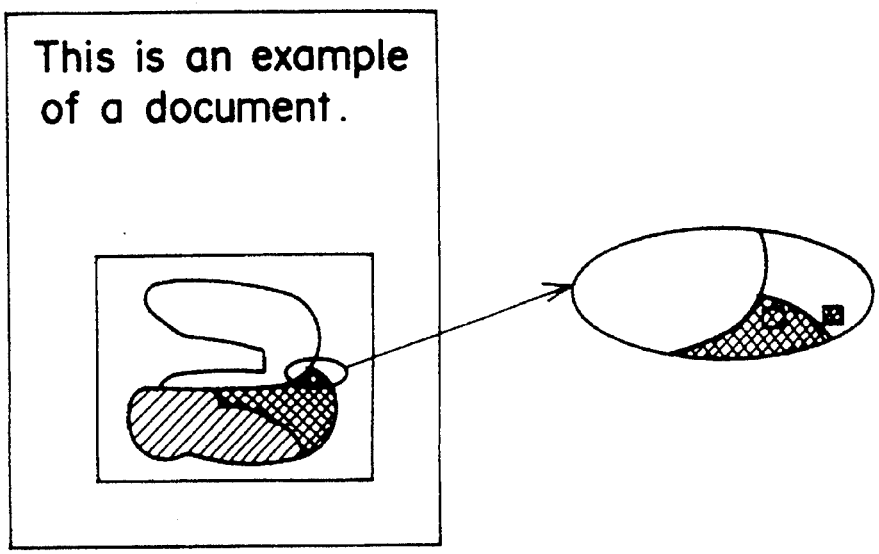
FIG. 9 is a diagram of an example of an image of a document consisting of various densities wherein a digital data is embedded.

For a document wherein the density of an image changes complicatedly, it becomes hard for embedded digital data to be recognized from an image. Therefore, a block data is embedded at an area wherein the density does not change largely. However, a block data can also be embedded over a plurality of areas if there is no density change in each of the areas for example in two areas as shown in FIG. 9, or if there are areas not having a density assigned for the block data.

Figure 10A:
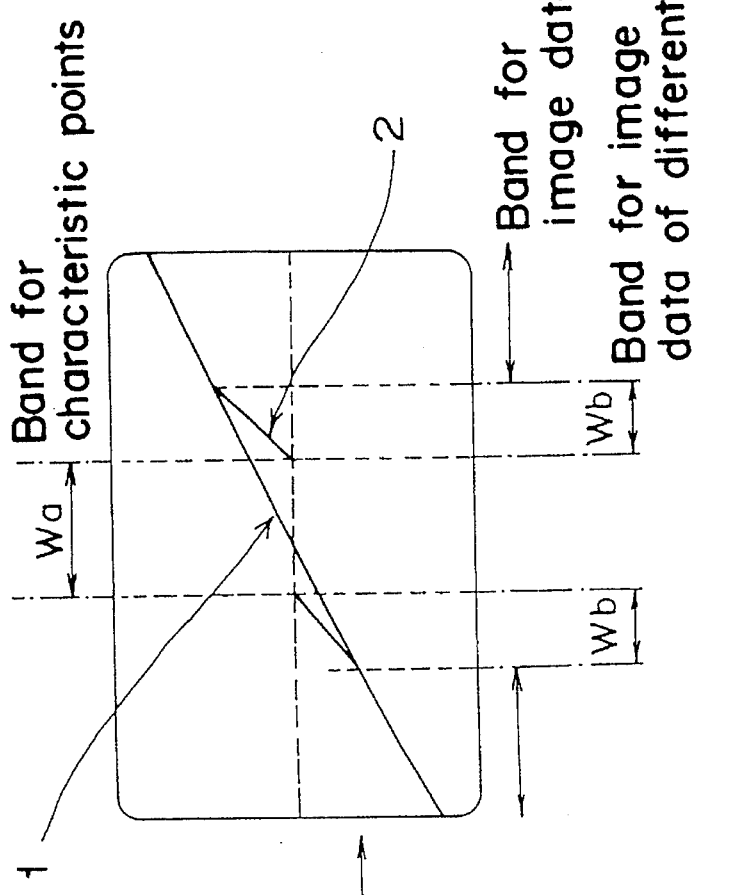
FIG. 10A is a diagram for changing the density of a document image when the density of the document image changes continuously.
Figure 10B:
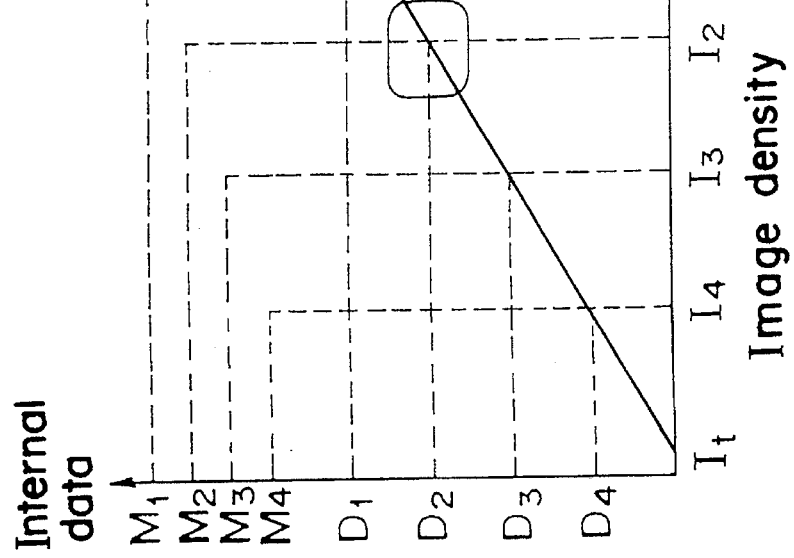
FIG. 10B is an enlarged diagram of a part of the diagram shown in FIG. 10A.

In principle, a predetermined density band is assigned for density data generated from block data in order to embed a digital data. However, as shown in FIGS. 10A and 10B, for a half-tone image wherein the density changes continuously, the density values are changed for a density band "Wa" assigned to density data of block data, as shown enlarged in the right side. That is, in density bands "Wb" at both sides of the density band "Wa", the slope "1" of reproduced density with the image density is changed as slopes "2", or the image density of document in the density band "Wa" is driven out from the band "Wa".

Figure 11:
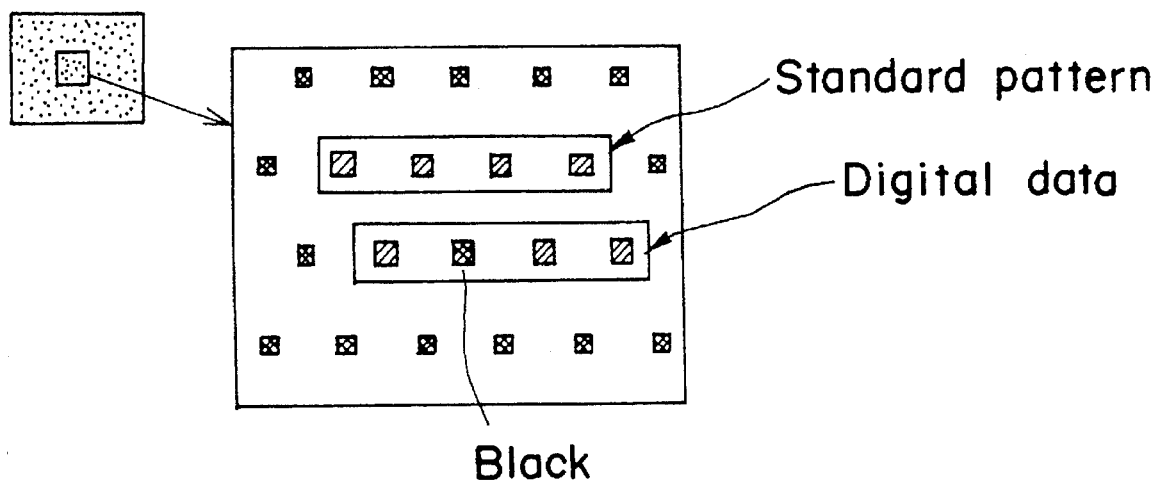
FIG. 11 is a diagram of an example of embedding block data in parallel to a standard pattern for a document image wherein a long data cannot be embedded continuously.

A long continuous density data cannot be embedded in some figures such as a pattern of parallel narrow lines or the like. In FIG. 11, density data can be embedded even in such a case by using each pattern itself as a density data to express a block data. Further, as shown in FIG. 11, a standard pattern may be embedded in parallel to the block data (four dots in this example) without using density data for MSB and LSB, and a block data as long as the standard pattern can be embedded. In this method, though the width is enlarged, the length can be shortened.

By performing the above-mentioned procedure, scramble information can be embedded in a document image, and a hard copy embedded with the digital data can be printed. Because the scramble information is included in a hard copy which will be subjected to scramble cancel processing, a memory exclusive for managing scramble conditions and a scramble code is not needed to be provided in the image processor.

(3) Scramble conditions, scramble code and special copy modes

A user can set scramble conditions. As explained above, the scramble conditions include values of l, m, p and q of 2 bytes or so for processing blocks and a level of scramble conditions. The values l, m, p and q represent sizes of processing blocks used in scramble processing of second and third levels. In the present embodiment, scramble conditions except the level of scramble processing are set as numerical values, while the level is set separately. When a user sets the scramble conditions, a document image is scrambled according to the scramble conditions, and the scramble conditions are converted to a digital data to be embedded in the image data after scramble processing. Then, the image data including the digital data is printed on a paper. Because the scramble codes used for scramble cancel are also embedded in the printed image as the digital data hard to be recognized, it is possible that any among image processors can be used to restore the document image. Further, the scramble cancel is difficult for a person who does not know the scramble conditions, and a secret can be protected effectively.

If a user does not set the scramble conditions, scramble processing is performed according to default scramble conditions. In this case, only the default scramble conditions are embedded in a printed image as a digital data.

In this case, a level for scramble cancel processing is set automatically according to an identification (ID) number of each user. Scramble cancel processing is carried out only if the level for scramble cancel set by the image processor is equal to the level of scramble processing. Thus, the ID number is used to manage an access level allowed for the user. On the contrary, when a user sets the scramble conditions, only a limited range of persons who know the scramble conditions can cancel the scramble processing.

It is convenient to change a level of scramble processing according to attributes of a document. Then, special copy modes are provided in the image processor.

There are different level of secret protection among documents. Some documents have to be protected from leakage very severely, while some may be allowed to be read by others in a wide range, for example, in a company. Then, in the image processor, the level of scramble processing is set according to the degree of secret protection.

Figure 12B:
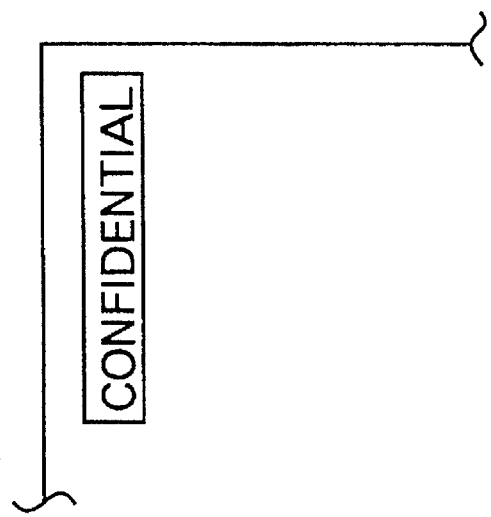
FIGS. 12A and 12B are diagrams of a part of document image where marks such as "SECRET" and "CONFIDENTIAL" are added.
Figure 12A:
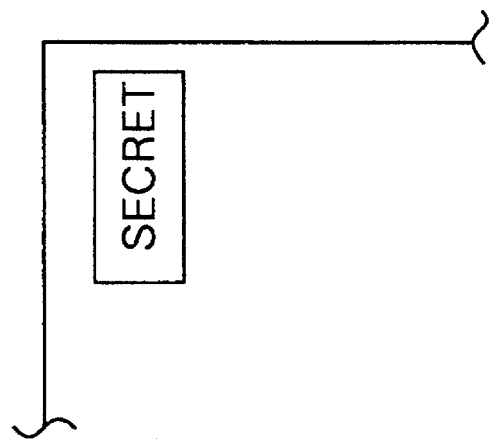

AS shown in FIGS. 12A and 12B, in general, important documents in an office or the like have marks such as "SECRET", "CONFIDENTIAL" or "FOR YOUR EYES ONLY" added to a front page thereof. Then, the image processor of the embodiment stores data on specified marks and can perform scramble processing according to a specified mark recognized from image data. That is, if a copy mode for specified marks is requested by a user, the level of scramble processing is set automatically according to one of the specified marks if it is recognized in an image data. Information on the level of scramble processing is embedded in an image by including it in a digital data as well as the scramble information explained above. For example, for a document including a mark of "CONFIDENTIAL", the level of the scramble processing is set as third level because documents with the mark have to be protected from leakage as severely as possible.

Further, the image processor of the present embodiment also has a copy mode for front page. The copy mode for front page is provided in order to make it easy to manage secret documents easy. The image processor has the automatic document feeder 201, and a front page can be decided from the order of document data received from the automatic document feeder 201. In the copy mode, a front page is not subjected to scramble processing at all or only to scramble processing of first level which deforms the image data not so largely or allows a hard copy to be read easily. In the copy mode, information on the levels of scramble processing of the front page and the following pates is also embedded by adding it to a digital data as well as the scramble information.

(4) Outline of image processor

Figure 13:
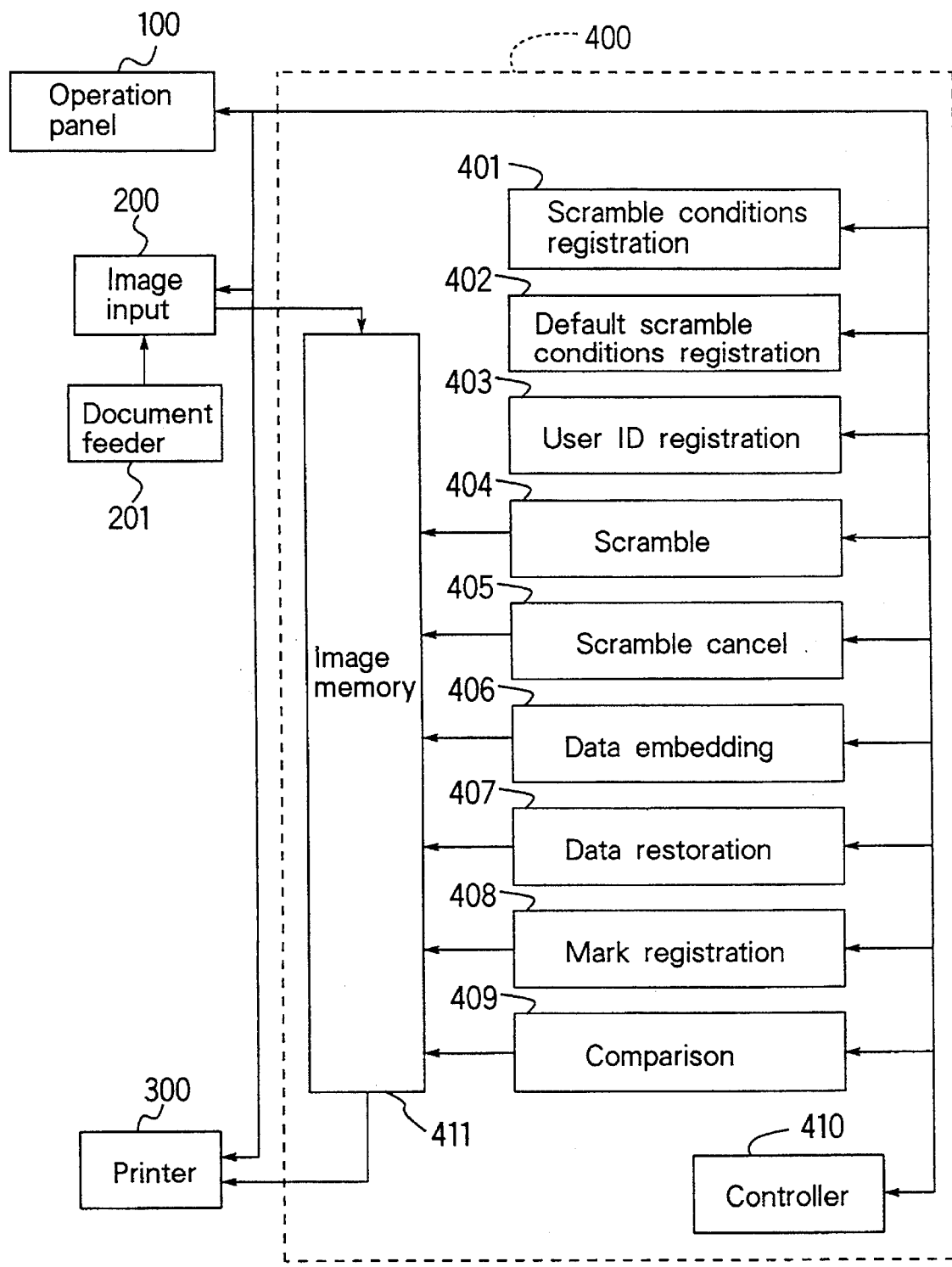
FIG. 13 is block diagram of an image processor of an embodiment of the invention.

FIG. 13 shows a block diagram of a controller of the image processor of the embodiment. A keyboard 100 can be used to set an ID number of a user, scramble conditions by a user and the like, and information from the keyboard 100 is sent to a control section 400. An image input section 200 comprises an image reader which reads an image of a document with a charge coupled device (CCD) sensor. It also has a known automatic document feeder 201 for reading image data of documents placed therein successively. A printer section 300 comprises a known electrophotographic digital printer which prints image data received from the control section 400. The control section 400 performs and controls image processing of image data received from the image input section 100, including the scramble and scramble cancel processings.

Next, blocks included in the control section 400 are explained. Scramble conditions registration section 401 comprises a memory which stores scramble conditions and scramble codes and it is accessed on scramble and scramble cancel processings. Default scramble conditions registration section 402 comprises a memory for storing default scramble conditions. User ID registration section 403 comprises a memory which stores ID numbers of users and levels of scramble processing being able to be canceled by the users. Scramble section 404 stores a scramble processing program which is run according to the scramble conditions stored in the scramble reprocessing registration section 401 or in the default processing registration section 402. Scramble cancel section 405 stores a scramble cancel program which is run by using the scramble conditions stored in the scramble conditions registration section 401 or in the default processing registration section 402 to restore an original image. Data embedding section 406 stores a data embedding program which converts scramble conditions set by a user and a scramble code to a digital data and embeds the digital data in an image. Data restoration section 407 stores a data restoration program which extracts a digital data embedded in a print of an image subjected to scramble processing when scramble cancel processing is performed. Mark registration section 408 comprises a memory to register marks such as "SECRET" and levels of scramble processing for each of the marks. Comparison section 409 has a comparison program which compares a mark added to a document with marks registered in the mark registration section 408. An image memory 411 comprises a random access memory connected to the image input section 100 and the printer section 300 and it stores a document image. A controller 410 controls the operation of the control section 400 and timings of the image input section 100 and the printer section 300.

Figure 14:
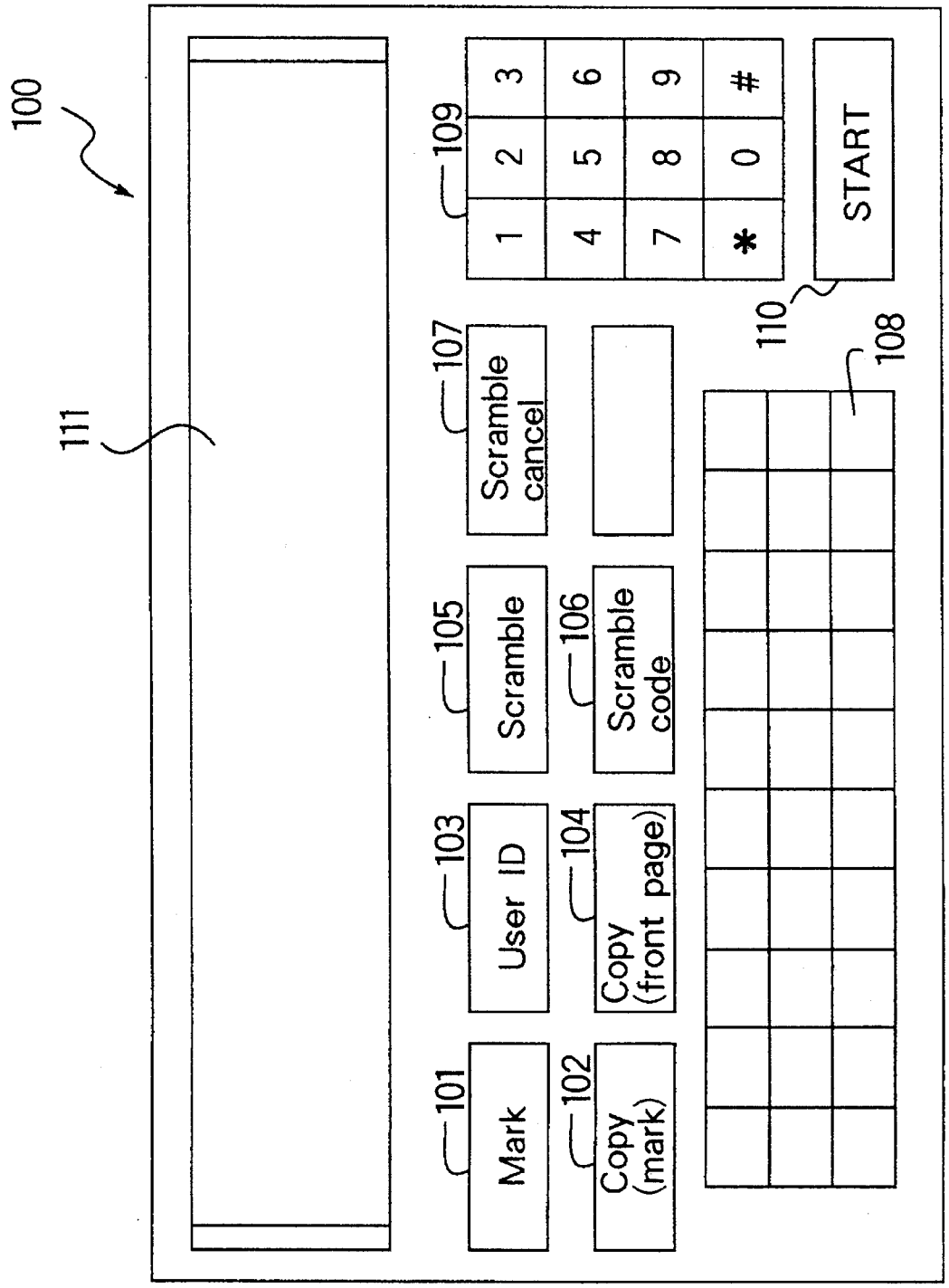
FIG. 14 is a top plan view of an operation unit.

FIG. 14 shows a top plan view of the operation section 100. When a user want to set scramble conditions, he or she first touches a key 105 for setting the scramble conditions and then sets scramble conditions with keys 108. When a user wants to input scramble codes for canceling the scramble processing, he or she first touches a key 106 for canceling the scramble processing and then sets scramble codes with ten-keys 109 by following instructions displayed by an LED display 111 for display. When a user starts scramble processing, he or she touches a start key 110 and sets a level of scramble processing. Then, the scramble processing on a document image is carried out. When a user wants to start scramble cancel processing to restore an original document image, he or she touches a scramble cancel key 107 and operates as instructed by the LED display 111. Then, the scramble cancel processing is started. When a user want to start scramble cancel processing to restore a document image with a specified mark, he or she touches a scramble cancel key 107 and operates as instructed by the LED display 111.

In order to register marks used in the above-mentioned copy mode for specified marks, a user touches mark registration key 101 first and a mark is registered. At the same time, a level of scramble processing for each registered mark is also set with the ten-keys 109. After registering the mark, when a user touches a key 102 for the copy mode for specified marks, the copy mode is started. If a user touches a key 104 for user ID registration, user information can be registered. If a user touches a key 104 for the copy mode for front page, the copy mode is started.

(5) Derails of various image processings

FIG. 15 shows a main flow of the controller 410. First, the control unit 400 is initialized (step S100), and the entire system is initialized (step S101). Then, it is waited that any input signal is received from the operation unit 100 (step S102).

If the signal from the operation unit 100 is decided to be a request of setting scramble conditions or if the key 105

Figure 16:
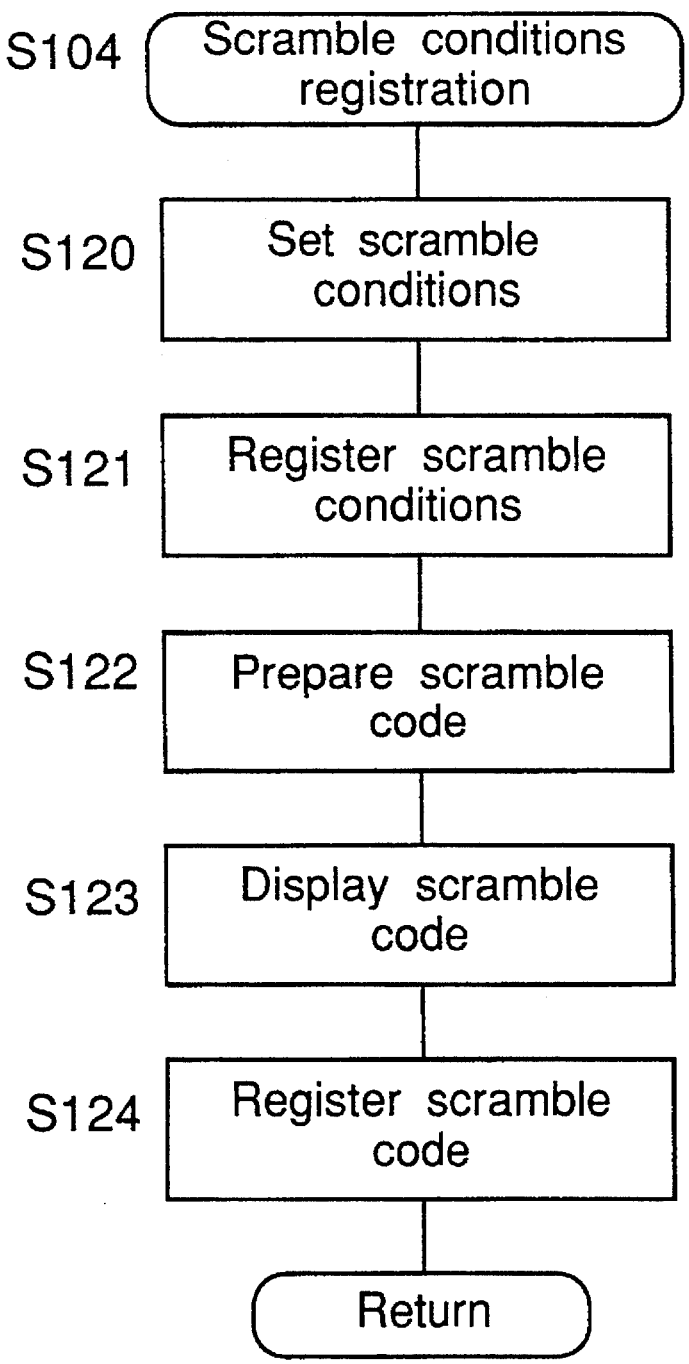
FIG. 16 is a flowchart of scramble conditions registration.

(FIG. 14) is decided to be touched (YES at step S103), scramble conditions are registered (step S104), refer also to FIG. 16). If the signal is decided to be a request of mark registration or if the key 101 is decided to be touched (YES at step S105), marks are registered (step S106, refer also to FIG. 17). If the signal is decided to be a request of user ID registration or if the key 103 is decided to be touched (YES at step S107), user information such as user ID numbers and levels of scramble processing therefor are registered (step S108). If the signal is decided to be a request of copy for specified marks or if the key 102 is decided to be touched (YES at step S109), the copy mode is performed (step S110, refer also to FIG. 18). If the signal is decided to be a request of copy for front page or if the key 104 is decided to be touched (YES at step S111), the copy mode is performed (step S112, refer also to FIG. 22). If the signal is decided to be a request of scramble cancel or if the key 107 is decided to be touched (YES at step S113), scramble cancel processing is performed (step S114, refer also to FIG. 23). Otherwise, the flow returns to step S102 to process a next input.

5.2 Scramble conditions registration

FIG. 16 shows a flow of the scramble processing registration (step S104 in FIG. 15). First, scramble conditions or values of l, m, p and q for processing blocks are set by a user with the keys 108 (step S120), and the scramble conditions are registered at the scramble conditions registration section 401 (step S121). Next, a scramble code is prepared according to the scramble conditions (step S122), and the scramble code is displayed in the LED display 111 (step S123). Then, the scramble code is registered at the scramble conditions registration section 401 (step S124), and the flow returns to the main flow.

5.3 Mark registration

Figure 17:
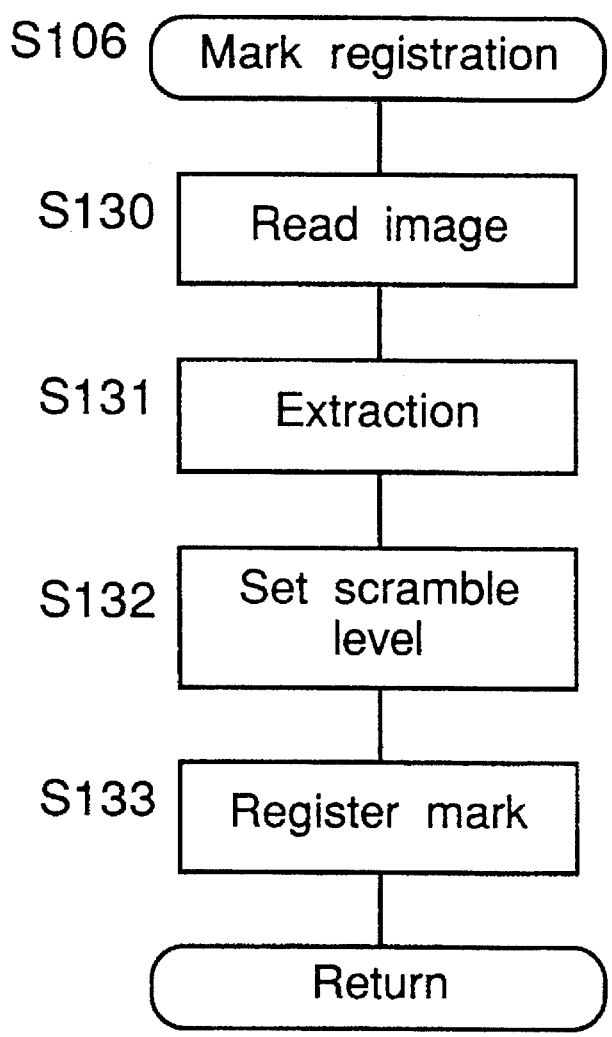
FIG. 17 is a flowchart of mark registration.

FIG. 17 shows a flow of the mark registration (step S110 in FIG. 15) wherein marks as shown in FIGS. 12A and 12B are registered. First, the image input section 200 is activated, and a document image read for a document which is intended to be copied in the copy mode for specified marks is received in the image memory 411 (step S130). Next, a mark included in the document image data is extracted (step S131). Next, a request for setting a level of scramble processing for the mark is displayed on the LED display 111, and the level set by a user is received (step S132). Then, the extracted mark and the level therefor are registered at the mark registration section 408 (step S133), and the flow returns to the main flow.

5.4 Copy for specified marks

Figure 18:
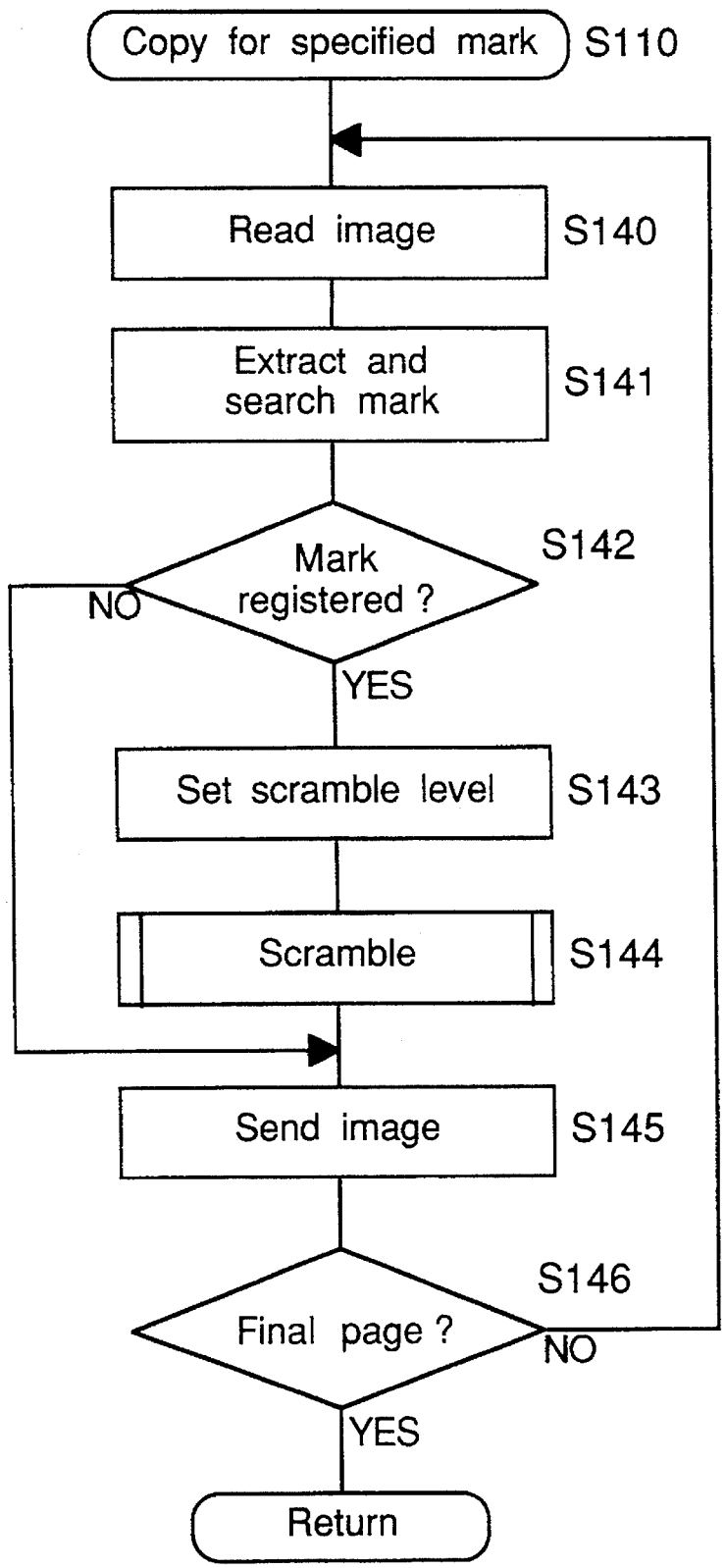
FIG. 18 is a flowchart of copy mode for specified marks.

FIG. 18 shows a flow of the copy mode for specified marks (step S110 in FIG. 15). First, the image input section 200 is activated, and a document image read for a document which is intended to be copied in the copy mode is received in the image memory 411 (step S140). Next, a mark included in the document image data is extracted (step S141), and a search is performed to confirm if the extracted mark is included in the marks registered in the mark registration section 408 (step S142).

If the extracted mark is decided to be included in the registered marks, a level of scramble processing for the mark is searched and set at the scramble section 404 (step S143). The program in the scramble section 404 reads scramble conditions registered at the scramble conditions registration section 401 if they are set by a user, otherwise it reads default scramble conditions set at the default scramble conditions registration section 402. Then, scramble processing is performed according to the scramble conditions read as mentioned above (step S144). Then, data subjected to scramble processing is stored in the image memory 411. On the other hand, if the extracted mark is decided not to be included among the registered marks (NO at step S142), the flow jumps to step S145 readily.

At step S145, the printer section 300 is activated to print the image stored in the image memory 411. If the extracted mark is registered, and a hard copy subjected to scramble processing at step S144 is obtained, otherwise a hard copy of document image is printed without scramble processing. Finally, if the document is decided not to be a final page (NO at step S146), the flow returns to step S140, otherwise the flow returns to the main flow.

Figure 19:
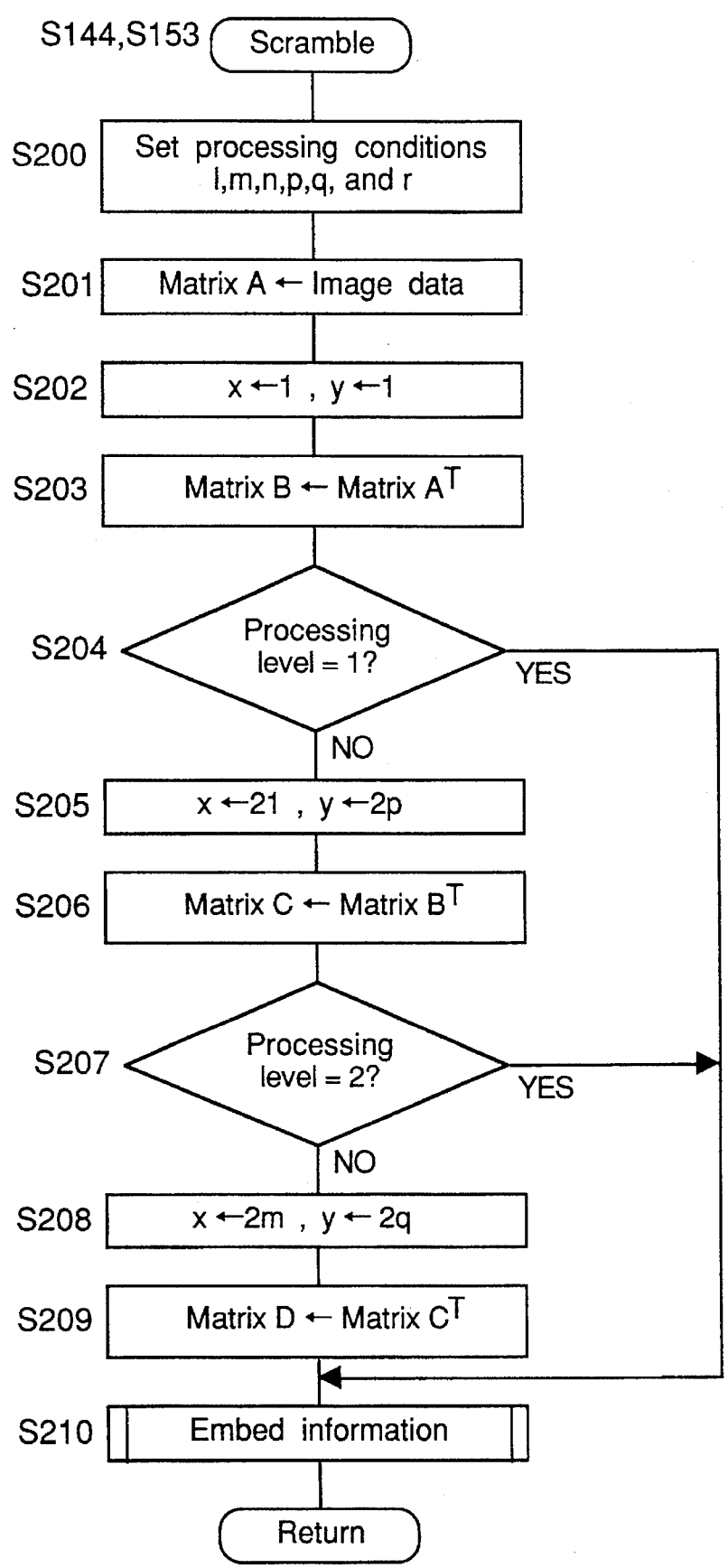
FIG. 19 is a flowchart of scramble processing.
Figure 22:
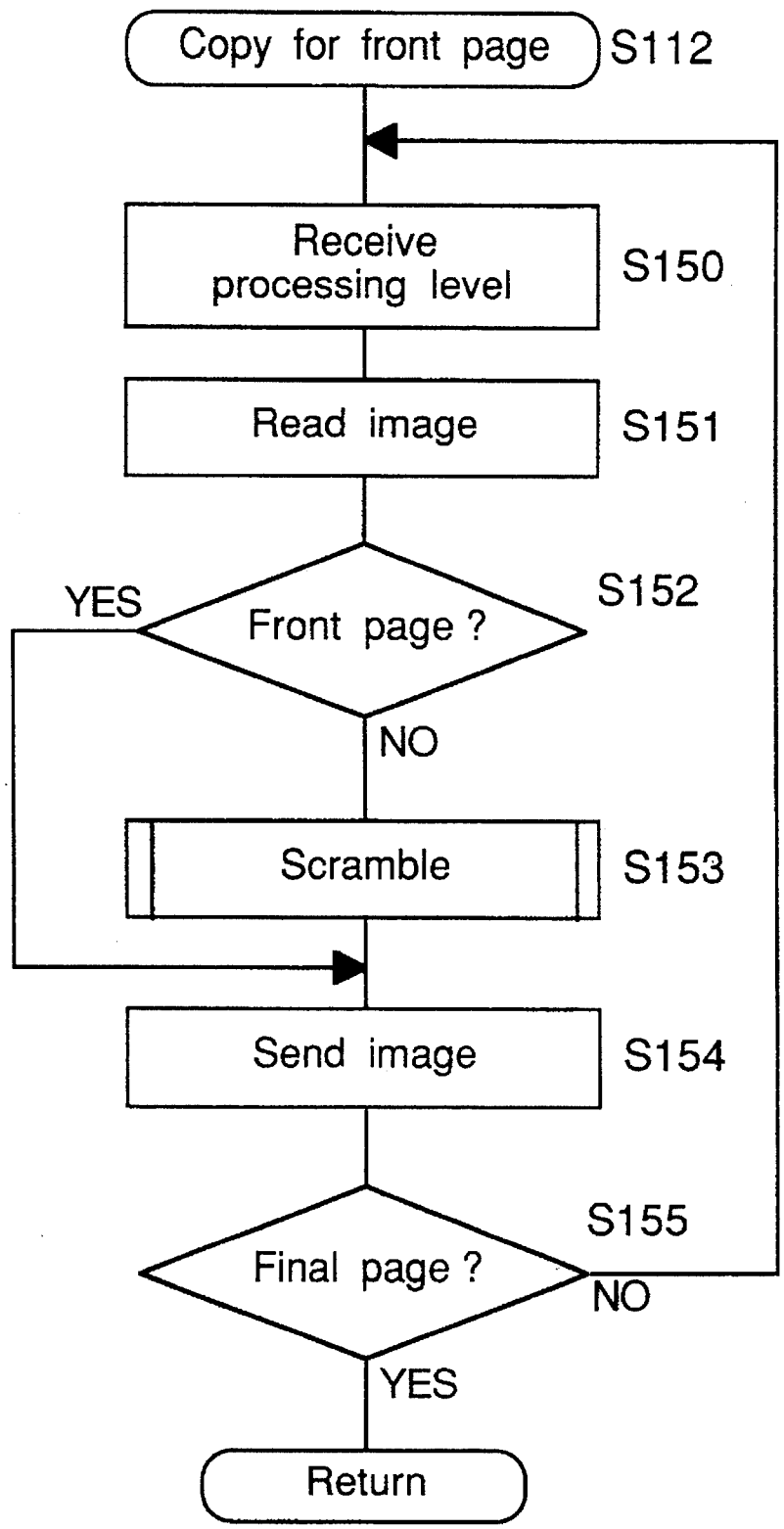
FIG. 22 is a flowchart of copy mode for front page.

FIG. 19 shows a flow of the scramble processing (step S144 in FIG. 18 and step S153 in FIG. 22 which will be explained later). First, the program in the scramble section 404 reads scramble conditions or values of l, m, p and q at the scramble conditions registration section 401 or the default scramble conditions at the default scramble conditions registration section 401 if a user does not set the scramble conditions (step S200). On the other hand, an arrangement of pixel data of the document image read at step S140 in FIG. 18 or step S151 in FIG. 22 is expressed as a matrix A (step S201). Next, a size of a processing block for scramble processing of first level is set. That is, x=1 and y=1 (step S202). The x and y denote a vertical side and a horizontal side of the processing block having a rectangular shape. The values mean that the processing block consists of one pixel. Then, transposition of the scramble processing of first level explained above is performed on minor matrices of the matrix A according to Eqs. (5) (step S203), and a transposed matrix B is obtained. Next, it is decided if the level of scramble processing set at the scramble section 404 is 1 or not (step S204). If the decision is YES, the flow proceeds to step S210 readily to embed scramble information.

If the decision is NO at step S204, scramble processing of second level is performed. First, a size of processing block for scramble processing of second level is set. That is, x=2l and y=2p (step S205). The values mean that the processing block consists of 2l*2p pixels. Then, transposition of the scramble processing of second level explained above is performed on the matrix B according to Eqs. (6) (step S206), and a transposed matrix C is obtained. Next, it is decided if the level of scramble processing set at the scramble section 404 is 2 or not (step S207). If the decision is YES, the flow proceeds to step S210 readily to embed scramble information.

If the decision is NO at step S207, scramble processing of third level is performed. First, a size of processing block for scramble processing of third level is set. That is, x=2m and y=2q (step S208). The values mean that the processing block consists of 2m*2q pixels. Then, transposition of the scramble processing of third level explained above is performed on the matrix C according to Eqs. (5) (step S209), and a transposed matrix D is obtained. Then, the flow proceeds to step S210 readily to embed scramble information.

Finally, at step S210, scramble information is embedded in the image data subjected to scramble processing (refer FIG. 20), and the flow returns to the main flow.

Figure 20:
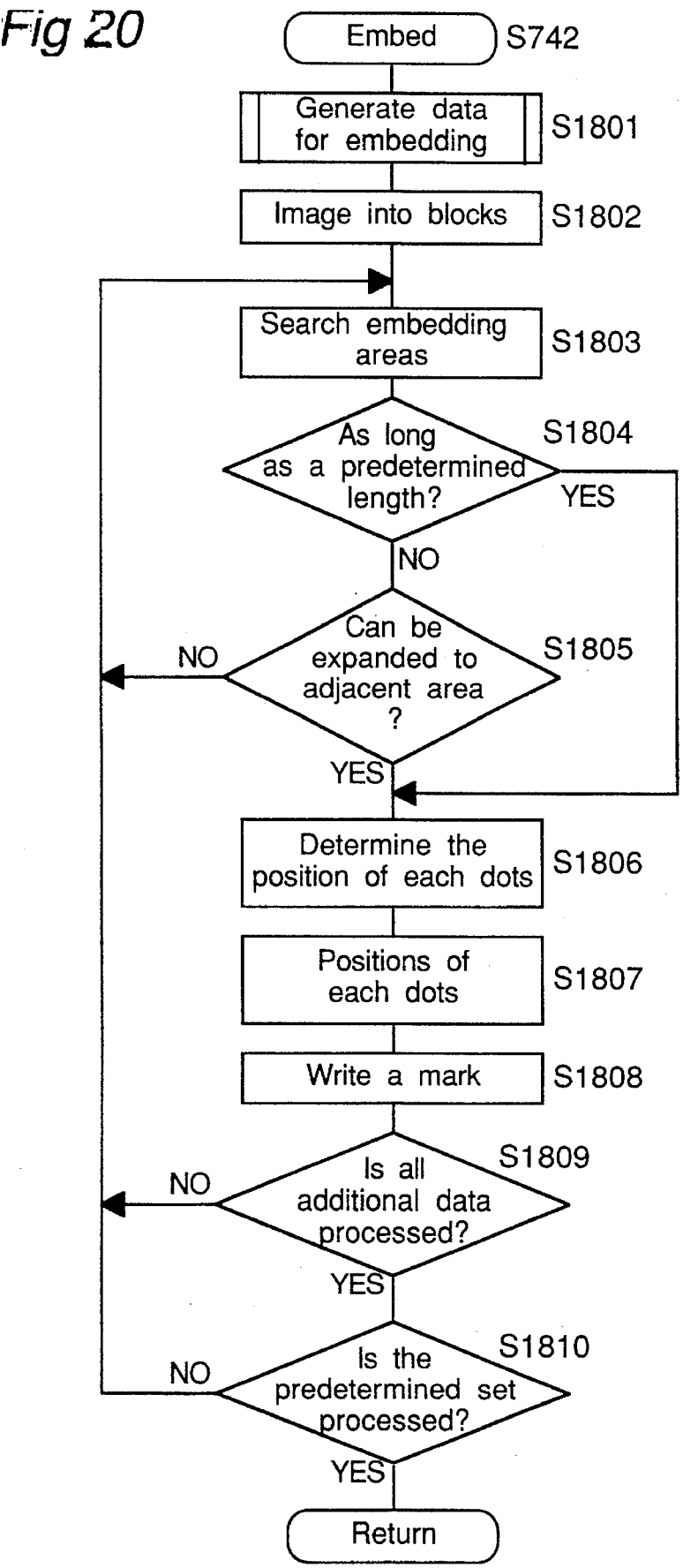
FIG. 20 is a flowchart of embedding information.

FIG. 20 shows a flow of embedding a digital data (step S210 in FIG. 19). The digital data includes scramble conditions (values of l, m, p and q), a level of scramble processing and scramble codes if a user sets the scramble conditions. First, block data of binary number are generated by dividing the digital data into blocks of a predetermined dot number added with a block number (step S1801, refer FIG. 21). Next, in order to embed each block data in a hard copy as shown in FIGS. 6 and 7A–7D, the values of the block data are converted into signals of density data (step S1802). Then, areas for embedding the block data in a hard copy subjected to scramble processing are searched (step S1803). Then, if an area as long as a predetermined length is decided to exist (YES at step S1804) or if an area is decided not so long as the predetermined length but it is decided to be extensible to an adjacent area because the density changes gradually (YES at step S1805), the positions of each dots are determined (step S1806), and the density values in a density block appropriate for the positions are determined for the positions (step S1807). Next, the block data determined above are written in the image data (step S1808). The above-mentioned processing is repeated until all digital data are processed ) YES at step S1809). Further, the above-mentioned processing is repeated until a predetermined number of sets are embedded (YES at step S1810).

Figure 5:
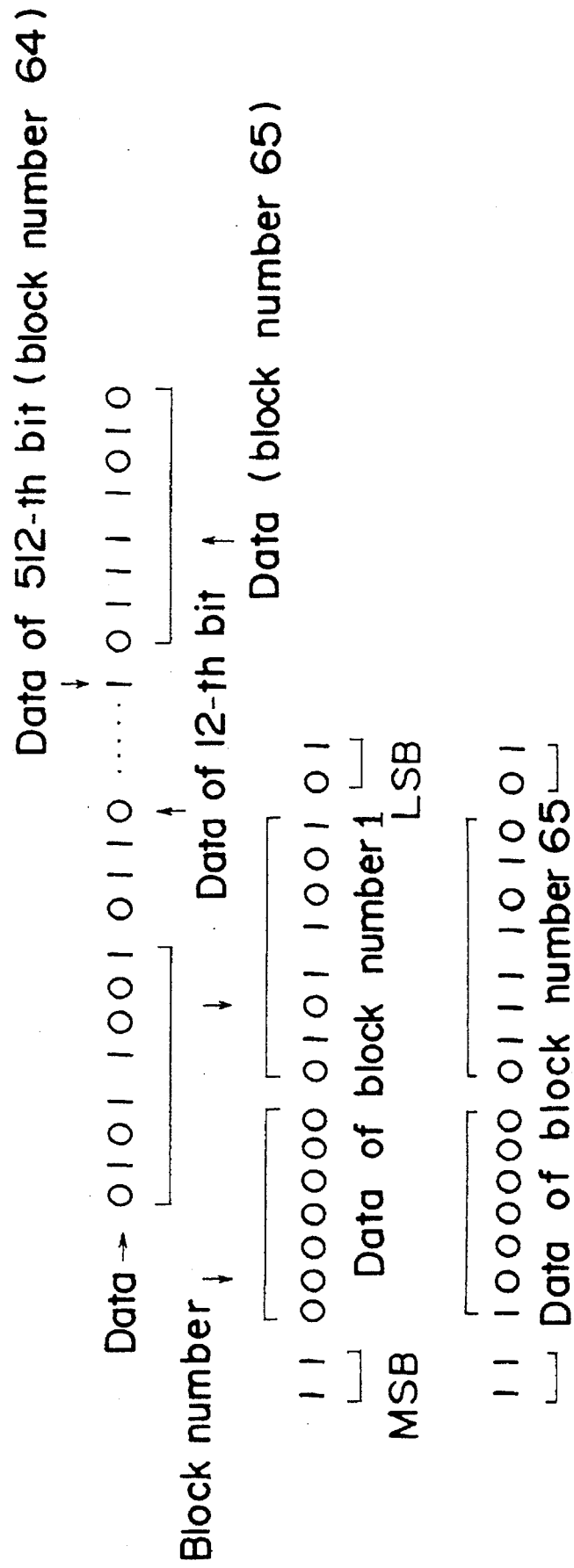
FIG. 5 is a diagram of an example of block data of first and 65-th blocks when binarized data of a digital data is divided into 8-bit data.
Figure 21:
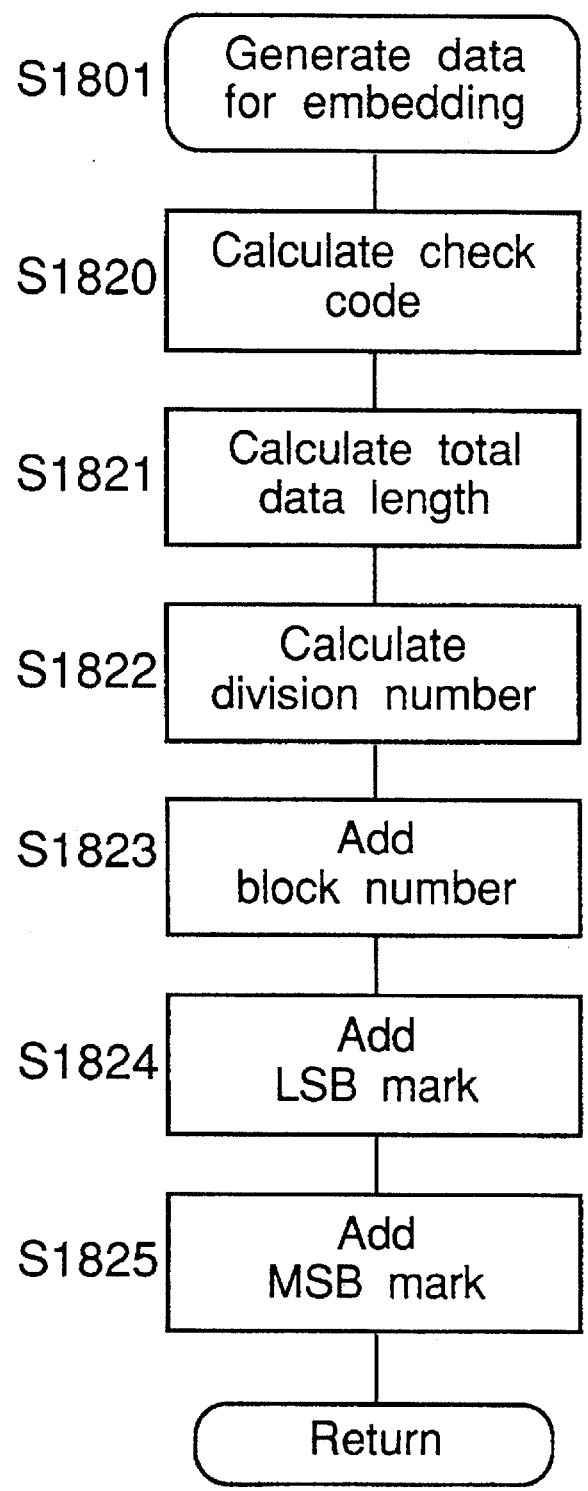
FIG. 21 is a flowchart of generating a digital data.

FIG. 21 shows a flow of generating data to be embedded (step S1801 in FIG. 20). In this flow, block data of binary number are generated by dividing the digital data into blocks of a predetermined dot number added with a block number. First, check codes for making it possible to recover embedded block data and codes for error correction are calculated (step S1820), and a total data length of the data to be embedded is calculated (step S1821). Further, the bit number for dividing the digital data into blocks is calculated and the number of blocks is calculated (step S1822). Further, a block number is added to each block data obtained by dividing the digital data (step S1823) and the end mark LSB for designating the start of the block data and the end mark MSB for designating the ends of the block data are added (steps S1824 and S1825). Thus, a block data as shown in FIG. 5 can be generated.

5.5 Copy mode for front page

FIG. 22 shows a flow of the copy mode for front page (step S112 in FIG. 15). First, a request is displayed in the LED display 111 for setting a level of scramble processing, and the level set by a user is sent to the scramble section 404 (step S150). Then, the image input section 200 is activated, and a document image read for a document which is intended to be copied in the copy mode is received in the image memory 411 (step S151). Next, it is decided if the document read by the image input section 200 is a front page or not (step S152). If the decision is YES at step S152, the flow proceeds to step S154 without scramble processing. On the other hand, if the decision is NO at step S152, the default scramble conditions set at the default scramble conditions registration section 402 are read. Then, scramble processing is performed according to the default scramble conditions (step S153). Then, data subjected to scramble processing is stored in the image memory 411.

Next, the printer section 300 is activated to print the image stored in the image memory 411 (step S154). Then, when the document is a front page, an ordinary hard copy of document image is printed without scramble processing, otherwise a hard copy subjected to scramble processing is obtained.

Finally, if the document is decided not to be a final page (NO at step S155), the flow returns to step S150, otherwise the flow returns to the main flow.

5.6 Scramble cancel

Figure 23:
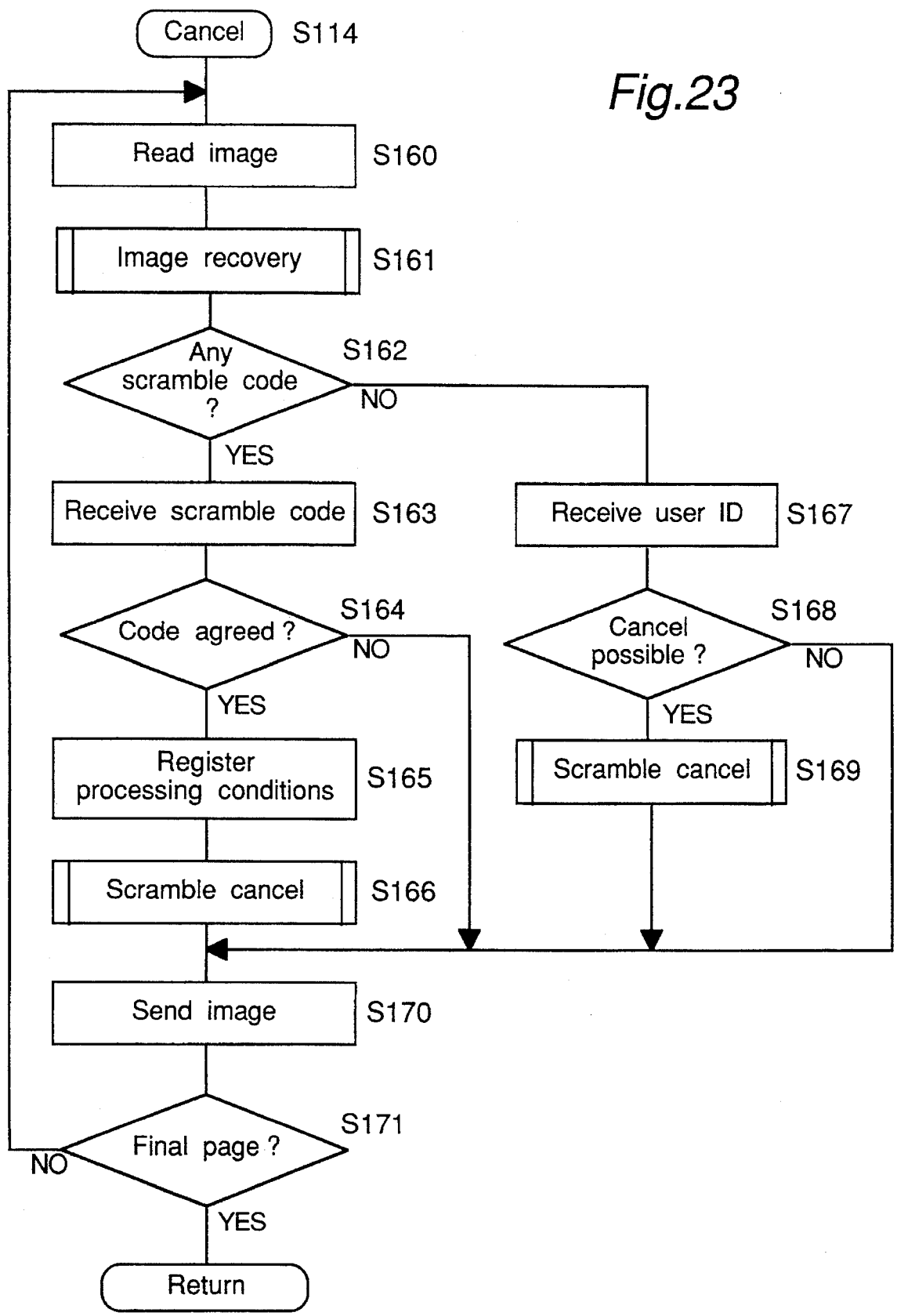
FIG. 23 is a flowchart of scramble cancel processing.

FIG. 23 shows a flow of scramble cancel processing (step S114 in page 15). First, the image input section 200 is activated, and a document image is read for a document which is intended to cancel scramble (step S160). Next, scramble conditions and a level of scramble processing are restored from the image data read by the image input section 200 (step S161, refer FIG. 24). Then, it is decided if scramble codes are included in the restored data (step S162).

If scramble codes are decided to be included (YES at step S162), a request to set scramble codes is displayed on the LED display 111, and scramble codes set by a user is received (step S163). Then, it is decided if the restored scramble codes agree with those set by the user (step S164). If they are decided to agree with each other (YES at step S164), restored scramble conditions are registered at the scramble conditions registration section 401 (step S165). Then, scramble cancel processing is performed according to the scramble conditions (step S166, refer FIG. 27). The scramble cancel section 405 stores data subjected to scramble cancel processing in the image memory 411. Then, the scramble cancel section 405 stores data subjected to scramble cancel processing in the image memory 411. On the other hand, if they are decided not to agree with each other (NO at step S164), the flow jumps to step S170 readily without scramble cancel processing.

If scramble codes are decided not to be included in the restored data (NO at step S162), the scramble processing is performed with the default scramble conditions. Then, a request to set a user ID number is displayed on the LED display 111, and a user ID number set by a user is received (step S167). Then, if the level set by the user is compared with a level read by the scramble cancel section 405 according to the user ID number (step S168). If the former is equal to or larger than the latter of the default scramble conditions (YES at step S168), scramble cancel processing is permitted (step S169, refer FIG. 27). Then, the data subjected to scramble cancel processing is stored in the image memory 411. Then, the flow proceeds to step S170.

At step S170, the printer section 300 is activated to print the image stored in the image memory 411 is printed. Finally, if the document is decided not to be a final page (NO at step S171), the flow returns to step S160, otherwise the flow returns to the main flow.

Figure 24:
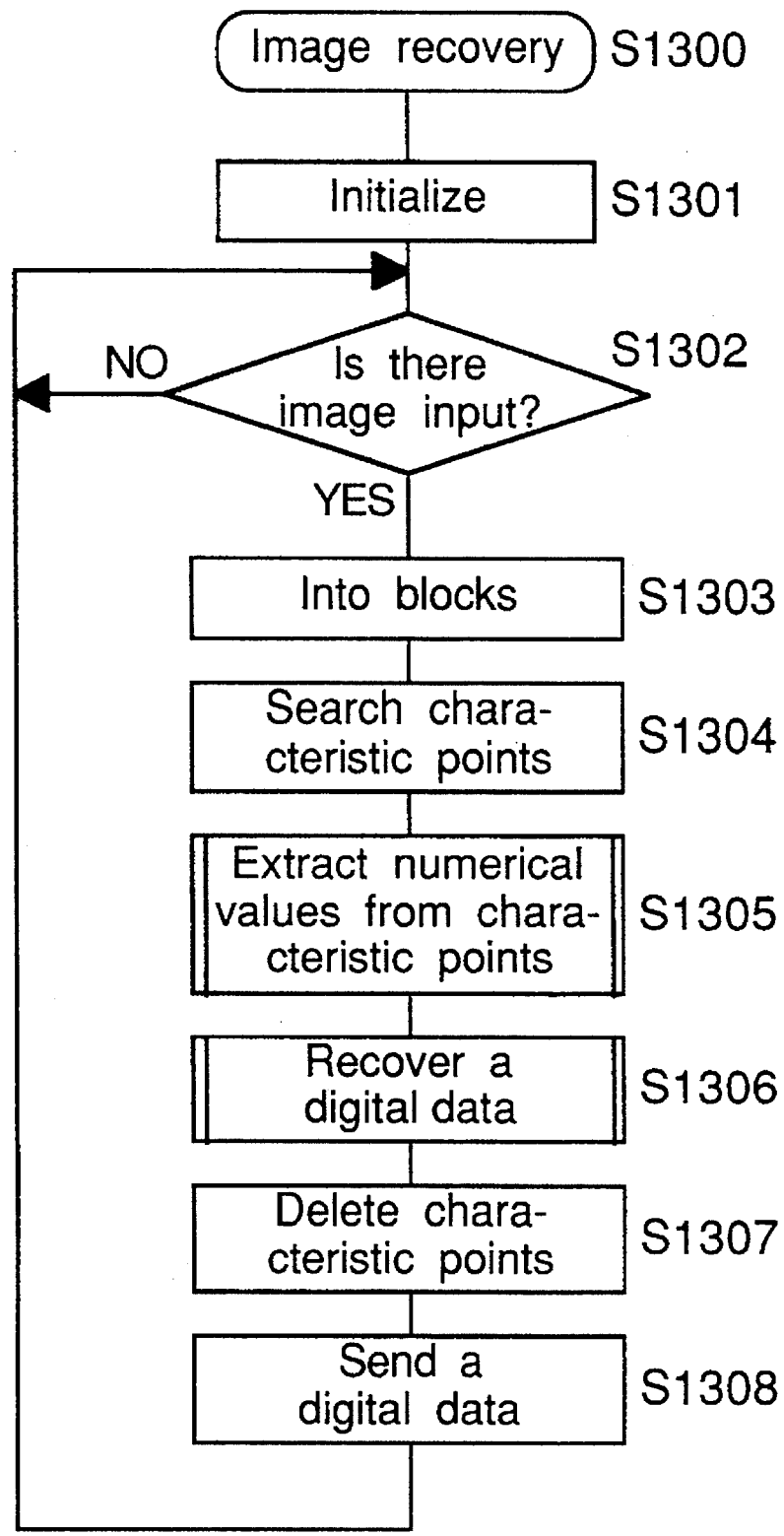
FIG. 24 is a flowchart of image recovery processing.

FIG. 24 shows a flow of image recovery (step S161 in FIG. 23) where a digital data embedded in a hard copy subjected to scramble processing is read out. After the initialization (step S1301), an image data is received (YES at step S1302). Then, the image data are divided into areas each for different density distribution in an image (step S1303), and coordinates for characteristic points are searched (step S1304). A characteristic point denotes a pixel having a predetermined density (refer FIG. 6). Further, binary numbers are extracted from the characteristic points according to the predetermined position relation between them (step S1305, refer FIG. 25). The binary numbers extracted in the unit of blocks are rearranged in the order of block number according to a predetermined procedure to recover a digital data (step S1306, refer FIG. 26). After the extraction of binary numbers is completed, the characteristic points are deleted from the image data (step S1307) to recover an image data before adding the a digital data. The deletion of characteristic points can be performed by replacing each characteristic point with a density of the pixels adjacent to the characteristic point. The extracted digital data is sent to the scramble cancel section 405 (step S1308) ). Then, the flow returns to step S1302.

Figure 25:
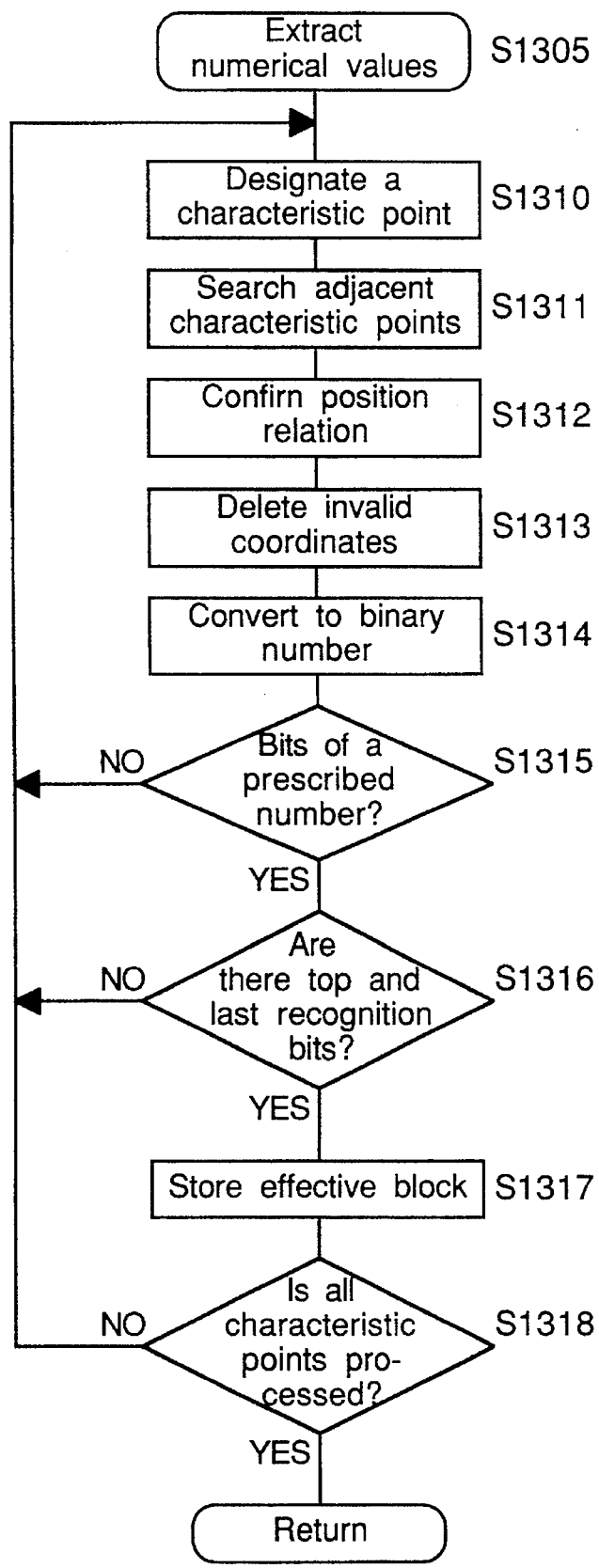
FIG. 25 is a flowchart for extracting numerical data of characteristic points.

FIG. 25 shows a flow of the extracting numerical values from characteristic points (step S1305 in FIG. 24). The extraction of binary numbers is performed by judging the position relation of characteristic points. In this embodiment, a block of an additional data is embedded linearly within a predetermined range. The embedding may not necessarily be performed in a linear line and may be performed for example along an arc if the position relation is defined beforehand.

First, a characteristic point is searched (step S1310). Then, all the other characteristic points existing within the predetermined range are searched (step S1311). The maximum length of the predetermined range amounts to the length of a block (i.e. the bit length times the bit-to-bit distance). Next, it is confirmed if the coordinates of the characteristic points have the predetermined position relation (a linear line in this example) (step S1312), and invalid coordinates and data are deleted (step S1313). Then, the coordinates of the valid data of a block are converted to a binary number (step S1314). Next, if it is decided that the binary number has a prescribed number of bits (YES at step S1315) and that the binary number includes top and last recognition bits (YES at step S1316), the binary data is stored as a valid data (step S1317). The above-mentioned processing is repeated until all characteristic points are processed (YES at step S1318).

Figure 26:
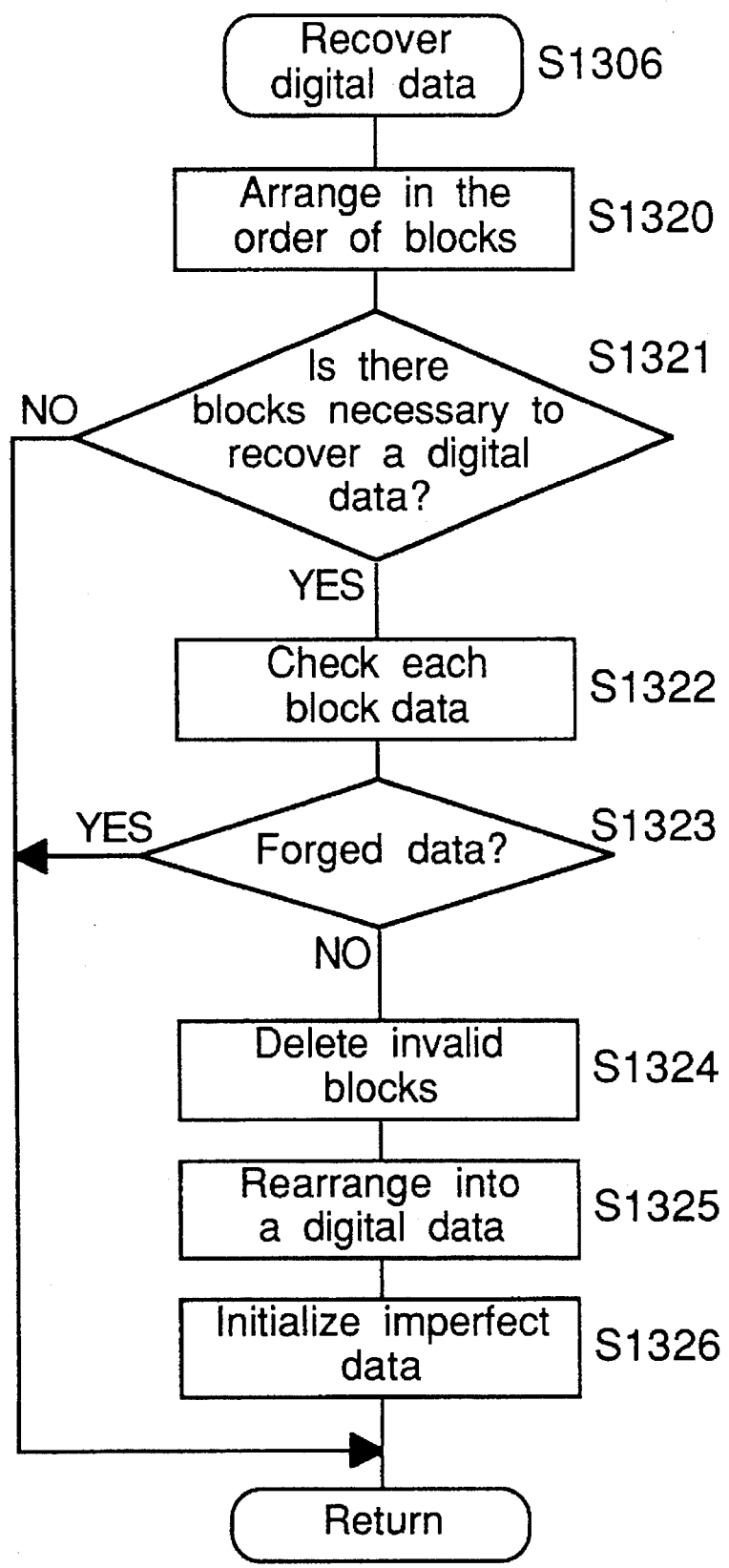
FIG. 26 is a flowchart of recovering a digital data.

FIG. 26 shows a flow of the recovery of digital data (step S1306 in FIG. 25) wherein the data of the valid blocks obtained at step S1305 are converted to a binary data. First, the data of the valid blocks are arranged in a row in the order of block number included in the data (step S1320). Then if it is decided that blocks enough at least to recover a digital data are available (YES at S1323), the data of each block is checked (step S1322). In this embodiment, a plurality of sets of an additional data is embedded in a hard copy, and it is verified if the data of the same block number are the same with each other. If the data of the same block number are not the same, the data of the majority is adopted. If the data of the blocks cannot be determined by the majority decision, the data is made invalid. If the number of invalid blocks is more than a predetermined number (YES at step S1323), this means that the hard copy is a forged document made from a patch work of a plurality of documents, and the flow returns readily to the main flow. If it is decided that the hard copy is not a forged document (NO at step S1323), the data of the invalid blocks are deleted (step S1324) and the data of the valid blocks are rearranged to recover a digital data (step S1325). Further, imperfect data having defects are initialized with predetermined values such as zeros or spaces (step S1326).

Figure 27:
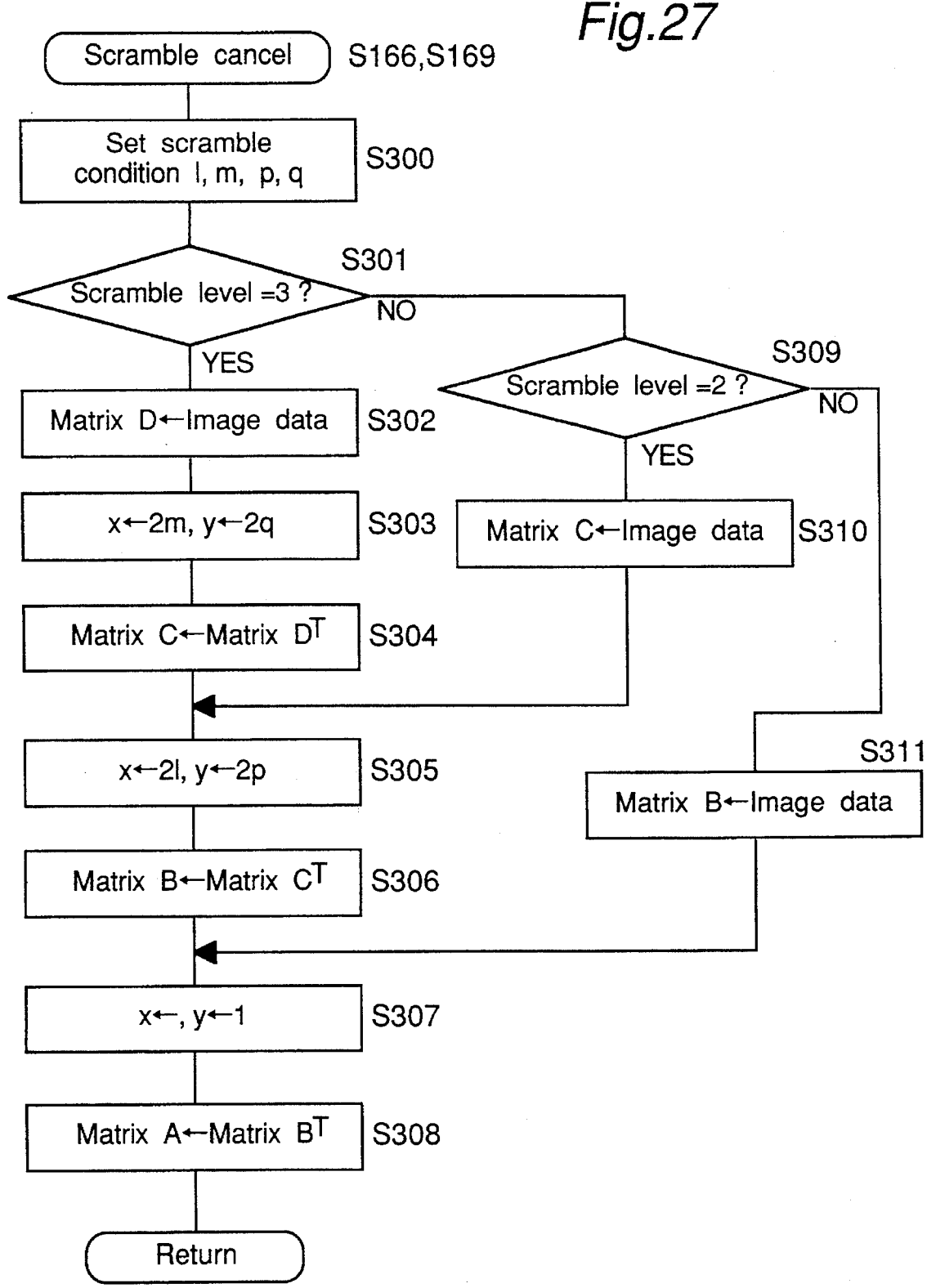
FIG. 27 is a flowchart of scramble cancel processing.

FIG. 27 shows a flow of the scramble cancel processing (steps S166 and step S169 in FIG. 23). First, scramble conditions or values of l, m, p and q at the scramble conditions registration section 401 are read or the default scramble conditions at the default scramble conditions registration section 402 are read if a user does not set the scramble conditions (step S300). Then, it is decided if the level of scramble processing set at the scramble cancel section 405 is 3 or not (step S301). If the decision is YES at step S207, an arrangement of pixel data of the document image read at step S160 in FIG. 23 is expressed as a matrix D (step S302), and scramble cancel processing of third level is performed. First, a size of processing block for scramble processing of third level is set. That is, x=2m and y=2q (step S303). The x and y denote a vertical side and a horizontal side of the processing block having a rectangular shape. The values mean that the processing block consists of 2m*2q pixels. Then, transposition of the scramble processing of third level explained above is performed on the matrix D according to Eqs. (7) (step S304), and a transposed matrix C is obtained.

Next, scramble processing of second level is performed. First, a size of processing block for scramble processing of second level is set. That is, x=2l and y=2p (step S305). The values mean that the processing block consists of 2l*2p pixels. Then, transposition of the scramble processing of second level explained above is performed on the matrix C according to Eqs. (6) (step S306), and a transposed matrix B is obtained.

Next, a size of processing block for scramble processing of first level is set. That is, x=1 and y=1 (step S307). The values mean that the processing block consists of one pixel. Then, transposition of the scramble processing of first level explained above is performed on the matrix B according to Eqs. (5) (step S203), and a transposed matrix A is obtained. Then, the flow returns to the main flow.

Next, it is decided if the level of scramble processing set at the scramble run section 404 is 1 or not (step S204). If the decision is YES, the flow proceeds to step S210 readily to embed scramble information.

If the decision at step S301 is NO, it is decided next if the level of scramble processing set at the scramble run section 404 is 2 or not (step S309). If the decision is YES, an arrangement of pixel data of the document image read at step S160 in FIG. 23 is expressed as a matrix C (step S310), and the flow proceeds to step S305 to perform scramble processing of second level.

If the decision at step S309 is NO, the level of scramble processing set at the scramble run section 404 is 1. Then, an arrangement of pixel data of the document image read at step S160 in FIG. 23 is expressed as a matrix B (step S311), and the flow proceeds to step S307 to perform scramble processing of first level.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:

means for providing digital image data of an image of a document;

scramble means for performing scramble processing on said digital image data in accordance with scramble conditions to provide first digital data, said scramble conditions specifying a manner in which the image is enciphered by the scramble processing;

embedding means for embedding the scramble conditions in said first digital data;

image forming means for forming an image on a hard copy from the first digital data having the scramble conditions embedded therein;

read means for reading the image on said hard copy and converting said read image to second digital data having said scramble conditions embedded therein;

data restoration means for extracting said scramble conditions from said second digital data having the scramble conditions embedded therein; and descramble means for restoring said document image from the second digital data by using the scramble conditions extracted by the data restoration means.

2. The image processor according to claim 1, wherein the scramble means rearranges pixel data of said document image included in the first digital data.

3. The image processor according to claim 2, wherein the scramble means rearranges the pixel data in one of a plurality of levels, each of said plurality of levels representing a different degree of rearrangement of said pixels, and wherein the scramble conditions includes the one level.

4. The image processor according to claim 1, further comprising operation means for setting the scramble conditions by a user.

5. The image processor according to claim 1, wherein said embedding means embeds the scramble conditions as discrete dots which cannot be easily seen by the naked eye.

6. The image processor according to claim 4, further comprising setting means for setting default scramble conditions as the scramble conditions when a user does not set the scramble conditions.

7. The image processor according to claim 1, wherein the scramble conditions include a scramble code, and said descramble means restores said document image if the scramble code extracted by the data restoration means from the second digital data agrees with a code set by a user.

8. The image processor according to claim 1, further comprising registration means for registering identification numbers of users, wherein said descramble means restores said document image only if an identification number set by a user agrees with one of the registered identification numbers.

9. The image processor according to claim 3, further comprising registration means for registering identification numbers of users and levels permitted for the users, wherein said descramble means restores said document image only if an identification number set by a user agrees with one of the registered identification numbers and the level permitted for the one registered identification number set by the user is equal to or larger than the level included in the scramble conditions extracted by said data restoration means.

10. The image processor according to claim 1, wherein said means for providing digital image data includes:

a read unit for reading said document image and converting said document image into said digital image data;

a document feeder for feeding documents to the read unit; and control means for prohibiting scramble processing by said scramble means for a first document among documents fed by the document feeder.

11. An image processor comprising:

mark registration means for registering marks to be added to an image on a document;

means for providing digital image data of said image of said document including any marks added to said image on said document;

extraction means for extracting marks from said digital image data;

decision means for determining whether or not to activate a scramble means according to a mark extracted by the extraction means;

scramble means for performing scramble processing on said digital image data in accordance with scramble conditions to provide first digital data when said decision means determines to activate the scramble means, said scramble conditions specifying a manner in which the image is enciphered by the scramble processing;

embedding means for embedding the scramble conditions in said first digital data;

image forming means for forming an image on a hard copy from the first digital data having the scramble conditions embedded therein;

read means for reading said image on said hard copy and converting said read image to second digital data having said scramble conditions embedded therein;

data restoration means for extracting said scramble conditions from said second digital data having the scramble conditions embedded therein; and descramble means for restoring said document image from the second digital data by using the scramble conditions extracted by the data restoration means.

12. The image processor according to claim 10, wherein the scramble means rearranges pixel data of said document image included in the first digital data.

13. The image processor according to claim 12, wherein the scramble means rearranges the pixel data in one of a plurality of levels, each of said plurality of levels representing a different degree of rearrangement of said pixels, and wherein the scramble conditions includes the one level.

14. The image processor according to claim 13, wherein said mark registration means registers levels of scramble processing for each of the marks registered, and said scramble means performs scramble processing on the document image by using the scramble conditions including the level registered by said mark registration means in correspondence to the mark extracted by the extraction means.

15. The image processor according to claim 11, further comprising input means for setting the scramble conditions by a user.

16. The image processor according to claim 15, further comprising setting means for setting default scramble conditions as the scramble conditions when a user does not set the scramble conditions.

17. The image processor according to claim 11, wherein the scramble conditions include a scramble code, and said descramble means restores said document image if the scramble code extracted by the data restoration means from the second digital data agrees with a code set by a user.

18. The image processor according to claim 11, wherein said embedding means embeds the scramble conditions as discrete dots which cannot be easily seen by the naked eye.

19. The image processor according to claim 11, wherein said means for providing digital image data includes:

a read unit for reading said document image and converting said document image into said digital image data;

a feeder for feeding documents to the read unit; and a controller for prohibiting scramble processing by said scramble means for a first document among documents carried by the feeder.

20. The image processor according to claim 1 wherein said scramble conditions include at least one of either a size of processing blocks used in the scramble processing or a level of scramble processing.

21. The image processor according to claim 11 wherein said scramble conditions include at least one of either a size of processing blocks used in the scramble processing or a level of scramble processing.

22. An image processing method comprising:

a) providing digital image data of an image of a document;

b) scrambling the digital image data in accordance with scramble conditions to provide scrambled digital image data, said scramble conditions specifying a manner in which the image is enciphered;

c) embedding the scramble conditions in the scrambled digital image data;

d) forming an image on an output medium from the scrambled digital image data having the scramble conditions embedded therein;

e) extracting the scramble conditions from the image on said output medium; and f) restoring said original document image from the image on said output medium by using the extracted scramble conditions.

* * * * *